(12) United States Patent
 Ishikura

(10) Patent No.: US 8,264,730 B2
(45) Date of Patent: Sep. 11, 2012

(54) IMAGE PROCESSING APPARATUS AND IMAGE FORMING APPARATUS

(75) Inventor: Tomoya Ishikura, Nara (JP)

(73) Assignee: Sharp Kabushiki Kaisha, Osaka (JP)

( * ) Notice: Subject to any disclaimer, the term of this patent is extended or adjusted under 35 U.S.C. 154(b) by 838 days.

(21) Appl. No.: 12/413,225

(22) Filed: Mar. 27, 2009

(65) Prior Publication Data

US 2009/0244577 A1    Oct. 1, 2009

(30) Foreign Application Priority Data

Mar. 28, 2008  (JP) ................................ 2008-088024
Nov. 6, 2008  (JP) ................................ 2008-285552

(51) Int. Cl.
 *G06K 15/00* (2006.01)
 *H04N 1/46* (2006.01)

(52) U.S. Cl. ...... 358/1.16; 358/1.9; 358/3.24; 358/3.26; 358/3.27; 358/524; 382/254; 382/257; 382/266

(58) Field of Classification Search ................ 358/1.9, 358/1.16, 3.24, 3.26, 3.27; 382/254–269
See application file for complete search history.

(56) References Cited

U.S. PATENT DOCUMENTS

| | | | | |
|---|---|---|---|---|
| 5,835,630 A | * | 11/1998 | Schweid et al. | 382/173 |
| 6,181,829 B1 | * | 1/2001 | Clark et al. | 382/273 |
| 6,304,679 B1 | * | 10/2001 | Clingerman et al. | 382/277 |
| 7,209,260 B1 | * | 4/2007 | Tanaka et al. | 358/1.2 |
| 2001/0048628 A1 | | 12/2001 | Koyanagi et al. | |
| 2005/0248578 A1 | | 11/2005 | Meeker | |
| 2007/0091378 A1 | * | 4/2007 | Ren | 358/426.13 |
| 2008/0313439 A1 | * | 12/2008 | Suzuki | 712/225 |

FOREIGN PATENT DOCUMENTS

| | | |
|---|---|---|
| JP | 5-183761 A | 7/1993 |
| JP | 10-003782 A | 1/1998 |
| JP | 2000-22958 A | 1/2000 |
| JP | 2001-53959 A | 2/2001 |
| JP | 2001-285644 A | 10/2001 |
| JP | 2003-271378 A | 9/2003 |

OTHER PUBLICATIONS

Office Action for co-pending U.S. Appl. No. 12/409,158 mailed Jan. 25, 2012.

* cited by examiner

*Primary Examiner* — Richard Zhu
(74) *Attorney, Agent, or Firm* — Birch, Stewart, Kolasch & Birch, LLP

(57) ABSTRACT

An image processing apparatus includes n line buffer circuits and a delay adjustment section. In a case of a filter process, (i) image data corresponding to n lines stored in the n line buffer circuits and (ii) image data corresponding to one line supplied to the delay adjustment section are outputted to a spatial filter process section in synchronization with each other. In a case of a dilation process, (i) image data corresponding to m lines stored in m line buffer circuits of the n line buffer circuits and (ii) image data corresponding to one line supplied to the delay adjustment section are outputted to a dilation process section in synchronization with each other. This reduces the size of a circuit of an image processing device including a plurality of types of image process sections for carrying out image processes by using image data with different numbers of lines.

7 Claims, 19 Drawing Sheets

FIG. 16 (a)

| 8 | 7 | 6 | 5 | 4 | 3 | 2 | 1 |
|---|---|---|---|---|---|---|---|
|16 |15 |14 |13 |12 |11 |10 | 9 |

⋮

OUTPUT IMAGE MEMORY

| 16 | 8 |
|----|---|
| 15 | 7 |
| 14 | 6 |
| 13 | 5 |
| 12 | 4 |
| 11 | 3 |
| 10 | 2 |
|  9 | 1 |

OUTPUT IMAGE MEMORY

IMAGE PROCESSING APPARATUS AND IMAGE FORMING APPARATUS

This Nonprovisional application claims priority under 35 U.S.C. §119(a) on Patent Application No. 2008-088024 filed in Japan on Mar. 28, 2008 and on Patent Application No. 2008-285552 filed in Japan on Nov. 6, 2008, the entire contents of which are hereby incorporated by reference.

TECHNICAL FIELD

The present invention relates to (i) an image processing apparatus and (ii) an image forming apparatus each of which includes a signal process section for outputting image data corresponding to a plurality of lines in synchronization with each other.

BACKGROUND ART

Conventionally, various types of signal process devices use a storage device containing a FIFO (First-in-First-out) memory such as a line buffer included in an image processing apparatus.

A technique for speeding operation of a FIFO memory is disclosed in Patent Literature 1 (Japanese Patent Application Publication, Tokukaihei, No. 10-3782 (Publication Date: Jan. 6, 1998)) for example, in which a FIFO memory is a dual port memory including two memory circuits, and writing and reading of data are alternately carried out with respect to each of the two memory circuits.

However, in a conventional image processing apparatus including a plurality of types of image process sections for carrying out image processes by using image data with different numbers of lines, there has been such a problem that the size of a circuit of the image processing apparatus is increased. This is because, in such the conventional image processing apparatus, each of the image process sections needs to include a signal process circuit containing line buffers whose number corresponds to the number of lines for image data to be used by the image process section. Examples of the processes carried out by the plurality of types of the image process sections may encompass: a filter process (e.g., a filter process for carrying out smoothing or moire removal with respect to image data of a halftone dot region or image data of a background region); a segmentation process (e.g., an edge judgment process, a color judgment process, and a halftone dot judgment process); a rotation process; a zoom process; a labeling process; and a dilation/erosion process for removing an isolated point.

Further, in a case where the technique disclosed in Patent Literature 1 is applied to a line buffer of an image processing apparatus, it is necessary to reduce the number of storage words (the number of pixels of a signal to be stored) of each memory circuit included in an FIFO memory to half the number of pixels along a main scanning direction, for the purpose of equalizing the number of storage words between the memory circuits. Therefore, in a case of carrying out a plurality of image processes in which different numbers of words per line are stored in the memory circuit, it is impossible to share the FIFO memory between sections for carrying out the image processes. For this reason, the image process sections for carrying out the above-mentioned image processes are required to be provided with signal process circuits, one for each image process section, respectively. This increases the size of the circuit.

SUMMARY OF INVENTION

The present invention was made in view of the foregoing problems, and an objective of the present invention is to reduce the size of a circuit of an image processing apparatus including a plurality of types of image process sections for carrying out image processes with use of image data corresponding to different numbers of lines.

In order to solve the foregoing problems, an image forming apparatus according to the present invention is an image processing apparatus for carrying out an image process with respect to image data including data corresponding to a plurality of lines, said image processing apparatus, including: a first process section for carrying out a first process in accordance with data corresponding to n lines (n: an integer equal to or more than 3); a second process section for carrying out a second process in accordance with data corresponding to m lines (m: an integer less than n); and a signal process section for causing data corresponding to a plurality of lines to be outputted in synchronization with each other, the signal process section including: (n−1) or more line buffers each of which stores data corresponding to one line; and a first delay adjustment section for delaying and outputting inputted data corresponding to one line, in a case where the first process is carried out, the signal process section causing (i) data corresponding to (n−1) lines stored in (n−1) line buffers and (ii) data corresponding to one line supplied to the first delay adjustment section to be outputted to the first process section in synchronization with each other, and in a case where the second process is carried out, the signal process section causing (i) data corresponding to (m−1) line(s) stored in (m−1) line buffer(s) among the (n−1) line buffers and (ii) data corresponding to one line supplied to the first delay adjustment section to be outputted to the second process section in synchronization with each other.

With this arrangement, the signal process section includes: (n−1) or more line buffers each of which stores data corresponding to one line; and the first delay adjustment section for delaying and outputting inputted data corresponding to one line. In a case where the first process is carried out, the signal process circuit causes (i) data corresponding to (n−1) lines stored in (n−1) line buffers and (ii) data corresponding to one line supplied to the first delay adjustment section to be outputted to the first process section in synchronization with each other. In a case where the second process is carried out, the signal process circuit causes (i) data corresponding to (m−1) line(s) stored in (m−1) line buffer(s) and (ii) data corresponding to one line supplied to the first delay adjustment section to be outputted to the second process section in synchronization with each other. Therefore, by sharing the signal process section between the first process section and the second process section, it is possible to carry out (i) the synchronization of data corresponding to n line(s) to be supplied to the first process section and (ii) the synchronization of data corresponding to m lines to be supplied to the second process section. This makes it possible to reduce the size of a circuit, compared with an arrangement where a signal process section for the first process section and a signal process section for the second process section are separately provided.

Additional objects, features, and strengths of the present invention will be made clear by the description below. Further, the advantages of the present invention will be evident from the following explanation in reference to the drawings.

BRIEF DESCRIPTION OF DRAWINGS

FIG. 16 (a) and FIG. 16 (b) are an explanatory view illustrating one example of a method of a rotation process carried out by the rotation process section illustrated in FIG. 14.

DESCRIPTION OF EMBODIMENTS

First Embodiment

One embodiment of the present invention is described below.
(1. Entire Arrangement)
FIG. 2 is a block diagram schematically illustrating a digital color multifunction peripheral (image forming apparatus) 1 including a color image processing apparatus (image processing apparatus) 10 according to the present embodiment.

The color image input apparatus 20 includes a scanner section including a Charge Coupled Device (hereinafter referred to as CCD) for example. The color image input apparatus 20 causes the CCD to read, as RGB analog signals, an optical image reflected from paper on which a document image is recorded, and outputs the signals to the color image processing apparatus 10.

Figure 2:
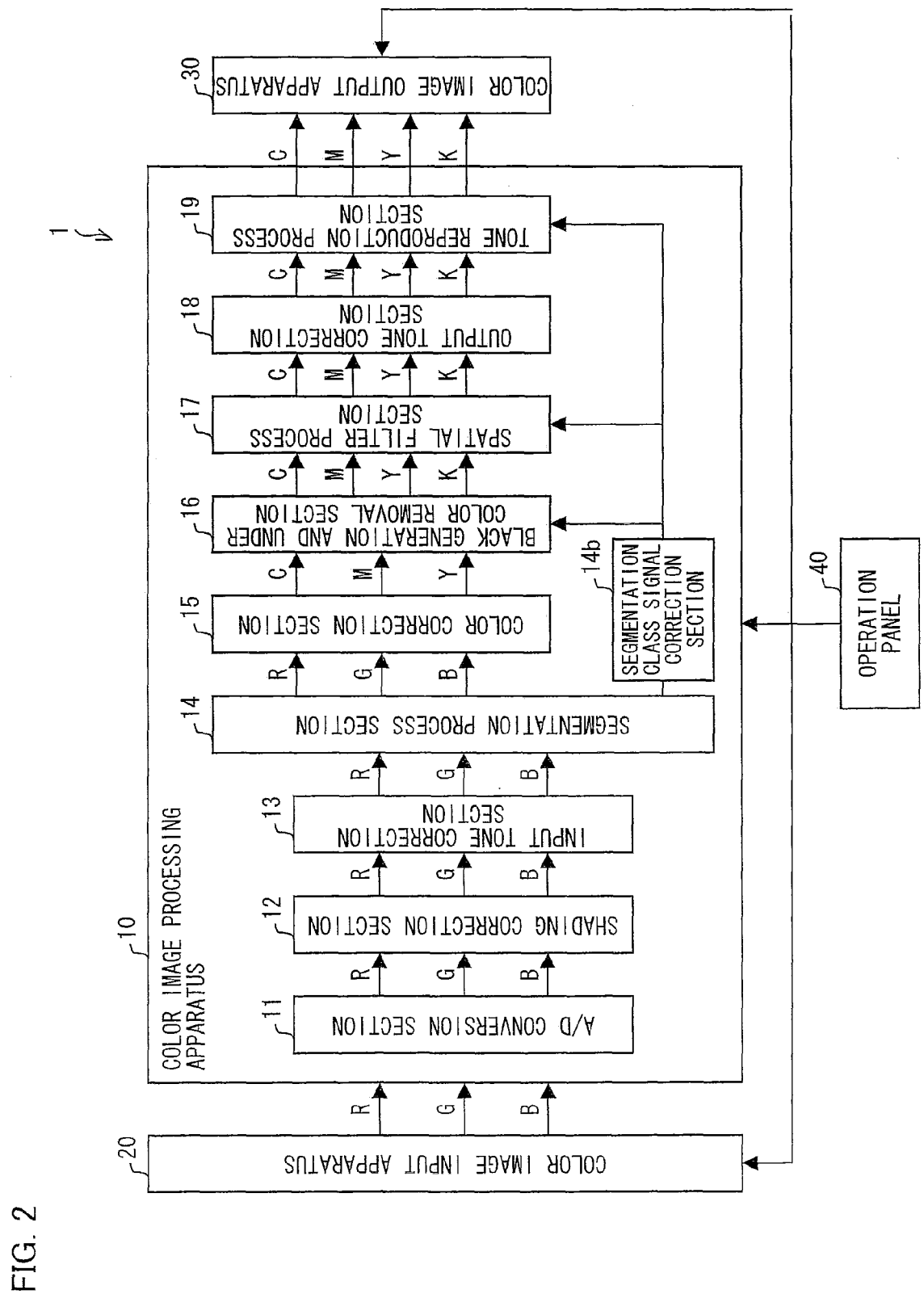
FIG. 2 is a block diagram illustrating an image processing apparatus according to an embodiment of the present invention.

As illustrated in FIG. 2, the color image processing apparatus 10 includes an A/D conversion section 11, a shading correction section 12, an input tone correction section 13, a segmentation process section 14, a color correction section 15, a black generation and under color removal section 16, a spatial filter process section 17, an output tone correction section 18, and a tone reproduction process section 19. A color image input apparatus 20 and a color image output apparatus 30 are connected to the color image processing apparatus 10. The color image processing apparatus 10, the color image input apparatus 20, and the color image output apparatus 30 constitute the digital color multifunction printer 1. The multifunction printer 1 is provided with an operation panel 40.

The analog signals read by the color image input apparatus 20 are transmitted in the color image processing apparatus 10 through the A/D conversion section 11, the shading correction section 12, the input tone correction section 13, the segmentation process section 14, the color correction section 15, the black generation and under color removal section 16, the spatial filter process section 17, the output tone correction section 18, and the tone reproduction process section 19 in this order, and are output to the color image output apparatus 30 as CMYK digital color signals.

The A/D conversion section 11 converts the inputted RGB analog signals into RGB digital signals. The shading correction section 12 removes various distortions produced in an illumination system, an image focusing system, and an image sensing system of the color image input apparatus 20 from the RGB digital signals transmitted from the A/D conversion section 11.

The input tone correction section 13 adjusts color balance of the RGB signals (RGB reflectance signals) from which the various distortions have been removed by the shading correction section 12, and converts the RGB signals into signals such as density signals that are easily processed in the color image processing apparatus 10. Further, the input tone correction section 13 carries out an image quality adjustment process such as contrast and removes background density.

The segmentation process section 14 separates each pixel of an input image represented by the RGB signals into either one of a text region, a halftone dot region, or a photograph (continuous tone) region. On the basis of a result of the separation, the segmentation process section 14 outputs a segmentation class signal, indicating which region a pixel of the input image belongs to, to a segmentation class signal correction section (second process section) 14b, and outputs the input signals as received from the input tone correction section 13 to the subsequent color correction section 15 without any modification.

A method for carrying out the segmentation process is not particularly limited, and may be any of conventional and publicly known methods. The present embodiment employs the segmentation process method disclosed in Patent Literature 2 (Japanese Patent Application Publication, Tokukai, No. 2002-232708 (Publication Date: Aug. 16, 2002)) so that input image data is separated into a text region, a halftone dot region, a photograph region, and a page background region.

In the method disclosed in Patent Literature 2, there are calculated (i) a maximum density difference that is a difference between the minimum density value and the maximum density value in a block having n×m (e.g. 15×15) pixels including a target pixel, and (ii) a total density busyness that is a total of an absolute value of a difference in density between adjacent pixels. The maximum density difference is compared with a predetermined maximum density difference threshold value, and the total density busyness is compared with a total density busyness threshold value. According to the results of the comparisons, a target pixel is separated into a text region, a halftone dot region, and other region (page background region, photograph region).

Specifically, in the case of the page background region, density distribution has little density change and therefore the maximum density difference and the total density busyness are very little. In the case of the photograph region (here, a continuous tone region such as a silver-halide photograph is referred to as a photograph region), density distribution shows smooth density change, and therefore the maximum density difference and the total density busyness are small and a little larger than those of the page background region. That is, in the cases of the page background region and the photograph region (other region), the maximum density region and the total density busyness are small.

Therefore, when it is judged that the maximum density difference is smaller than the maximum density difference threshold value and the total density busyness is smaller than the total density busyness threshold value, it is judged that a target pixel belongs to other region (page background region, photograph region). When it is not judged that the maximum density difference is smaller than the maximum density difference threshold value and the total density busyness is smaller than the total density busyness threshold value, it is judged that a target pixel belongs to a text region/halftone dot region. Further, when it is judged that the target pixel belongs to the page background region/photograph region, the target pixel is further separated into the photograph region and the page background region according to the maximum density difference and the total density busyness.

Further, when it is judged that the target pixel belongs to the text region/the halftone dot region, the calculated total density busyness is compared with a value obtained by multiplying the maximum density difference with a text/halftone dot judgment threshold value, and the target pixel is separated into a text region or a halftone dot region according to the result of the comparison.

Specifically, as for density distribution of the halftone dot region, the maximum density difference varies according to halftone dots, whereas the maximum density busyness shows density differences in the number corresponding to the number of halftone dots and consequently a ratio of the total density busyness to the maximum density difference gets larger. On the other hand, as for density distribution of a text region, the maximum density difference is large and accordingly the total density busyness is large, but the text region has smaller density change than the halftone dot region, and consequently the text region has smaller total density busyness than the halftone dot region.

Therefore, when the total density busyness is larger than a product of the maximum density difference and the text/halftone dot judgment threshold value, it is judged that the target pixel belongs to the halftone dot region. When the total density busyness is smaller than a product of the maximum density difference and the text/halftone dot judgment threshold value, it is judged that the target pixel belongs to the text region.

The segmentation class signal correction section 14b carries out a later-mentioned dilation process and a later-mentioned erosion process with respect to a segmentation class signal, thereby carrying out a correction process in which a noise such as an isolated point is removed from the segmentation class signal. Then, the segmentation class signal correction section 14b outputs the segmentation class signal having been subjected to the correction process to the black generation and under color removal section 16, the spatial filter process section 17, and the tone reproduction process section 19. The segmentation class signal correction section 14b will be detailed later.

The color correction section 15 removes color impurity on the basis of spectral characteristics of CMY color materials including an unnecessarily absorption component, in order to realize a faithful color reproduction.

The black generation and under color removal section 16 carries out (i) a black generation process for generating a black (K) signal from three color (CMY) signals having been subjected to the color correction and (ii) a process for generating new CMY signals by removing portions where original CMY signals overlap. As a result, the three CMY signals are converted into four CMYK signals.

With the use of a digital filter, the spatial filter process section (first process section) 17 carries out a spatial filter process on the basis of a segmentation class signal, with respect to image data which is received in the form of the CMYK signals from the black generation and under color removal section 16. In the spatial filter process, the spatial filter process section 17 corrects a spatial frequency characteristic, so as to reduce blur or granularity deterioration in an output image. The spatial filter process section 17 will be detailed later.

The output tone correction section 18 carries out an output tone correction process in which a signal such as a density signal is converted into a halftone dot area ratio that is a characteristic value of the color image output apparatus 30.

The tone reproduction process section 19, as with the spatial filter process section 17, carries out a predetermined process with respect to the image data in the form of the CMYK signals, on the basis of the segmentation class signal. The tone reproduction process section 19 carries out a tone reproduction process for processing the image data so that the halftone image is reproduced.

For example, a region separated by the segmentation process section 14 into a text region is subjected to the spatial filter process by the spatial filter process section 17 in which the text region is subjected to an edge enhancement process and a high frequency component is emphasized (sharpened) in order to increase reproducibility of black text or color text in particular. Then, the text region is subjected to a binarization process or a multi-level dithering process by the tone reproduction process section 19 by use of a screen suitable for reproduction of a high frequency component.

A region separated by the segmentation process section 14 into a halftone dot region is subjected to a low pass filter process by the spatial filter process section 17 in order to remove input halftone components. Then, the halftone dot region is subjected to a multi-level dithering process by use of a dither screen suitable for tone reproduction.

A region separated by the segmentation process section 14 into a photograph region is subjected to a binarization process or a multi-level dithering process by the tone reproduction process section 19 by use of a screen suitable for tone reproduction.

Image data subjected to the above processes is temporarily stored in a storage section (not shown) and then read out at a predetermined timing and outputted to the color image output apparatus 30.

The color image output apparatus 30 outputs an image corresponding to input image data onto a recording medium (such as paper). A method for forming an image that is employed by the color image output apparatus 30 is not particularly limited, and may be an electrophotography method, an ink-jet method etc. The above processes are controlled by a main control section (CPU; Central Processing Unit) (not shown).

The operation panel 40 receives input of instructions by a user, and information inputted to the operation panel 40 is transmitted to a main control section (not shown) of the color image processing apparatus 10. An example of the operation panel 40 is a touch panel in which a display section such as a liquid crystal display and an operation section such as setting buttons are integrated with each other. The main control section controls operations of sections of the color image input apparatus 20, the color image processing apparatus 10, and the color image output apparatus 30, on the basis of the information inputted to the operation panel 40.

(2. Signal Process Circuit 50)

Figure 1:
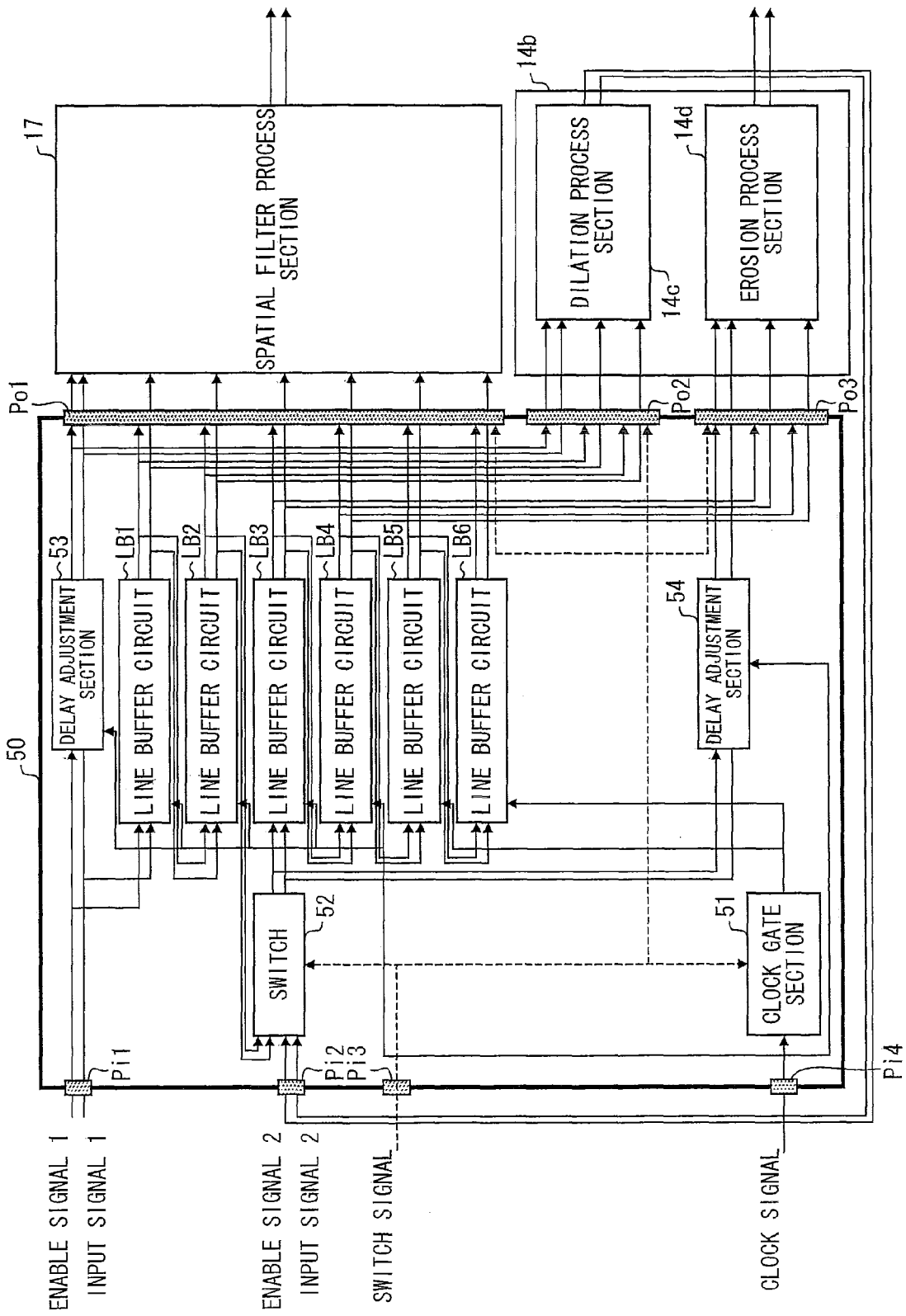
FIG. 1 is a block diagram illustrating a signal process circuit (a signal process device) according to an embodiment of the present invention.

In the present embodiment, the segmentation class signal correction section 14b and the spatial filter process section 17 carry out the processes, respectively, by sharing a signal process circuit (i.e., the signal process circuit 50 illustrated in FIG. 1).

FIG. 1 is a block diagram schematically illustrating an arrangement of the signal process circuit 50, the spatial filter process section 17, and the segmentation class signal correction section 14b.

The spatial filter process section 17 (first process section) carries out convolution of (i) a block made of pixels including a target pixel in image data to be processed with (ii) pixel values that are filter coefficients assigned to pixels of a matrix of the same size as that of the block. Thus, the spatial filter process section 17 obtains the results of filter processes (enhancement process, smoothing process, or process including characteristics of both enhancement process and smoothing process) on the pixels in the block with respect to the target pixel.

Figure 3:
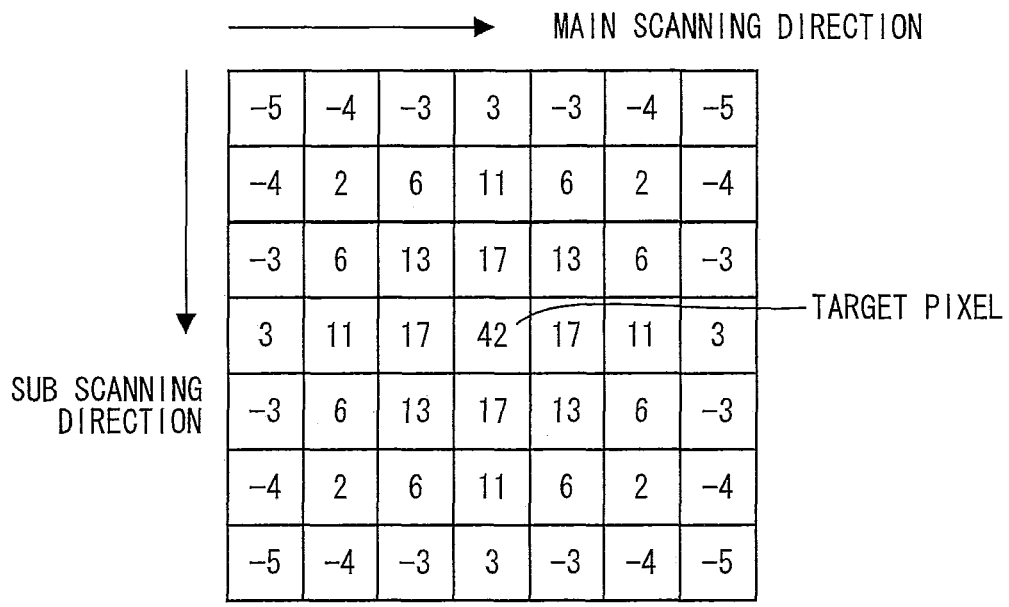
FIG. 3 is an explanatory view of one example of filter coefficients used by a spatial filter process section in the image processing apparatus illustrated in FIG. 2.

FIG. 3 is an explanatory view of a filter used by the spatial filter process section 17. As illustrated in FIG. 3, in the present embodiment, a filter including 7×7 pixels centering a target pixel is used. Specifically, the spatial filter process section 17 receives image data including 7 pixels in main scanning direction×7 pixels in sub scanning direction (7 lines) from the signal processing circuit 50, multiplies individual pixels of the input image data with filter coefficients corresponding to the respective pixels, calculates the total of the results of the multiplications with respect to each pixel, divides the calculated total by a predetermined value (set according to the total of filter coefficients with respect to each pixel in the filter. 186 in the present embodiment), and regards the resulting value as the result of a filter process with respect to the target pixel.

The spatial filter process section 17 carries out the filter process with respect to each of CMYK color components. For this purpose, the spatial filter process section 17 includes four signal processing circuits 50 corresponding to C, M, Y, and K, respectively. However, the present invention is not limited to this and may be arranged such that the spatial filter process section 17 includes only one signal processing circuit 50 which sequentially carries out the filter process with respect to C, M, Y, and K one by one.

As illustrated in FIG. 1, the segmentation class signal correction section (second process section) 14b includes a dilation process section 14c and an erosion process section 14d.

Figure 4:
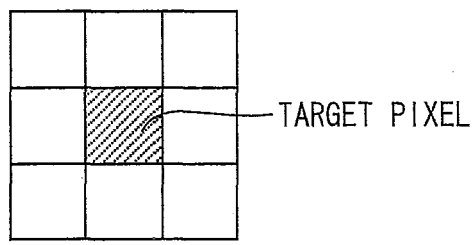
FIG. 4 is an explanatory view illustrating a relationship between a target pixel and reference pixels observed in a dilation process or an erosion process that are carried out by the image processing apparatus illustrated in FIG. 2.

The dilation process section 14c receives a segmentation class signal indicative of 3 pixels in main scanning direction×3 pixels (3 lines) in sub scanning direction including a target pixel from the signal processing circuit 50. With respect to each pixel, the dilation process section 14c carries out a dilation process in which values of 8 pixels around a target pixel in the inputted segmentation class signal are checked, and if at least one pixel judged to belong to a text region exists, the target pixel is regarded as belonging to a text region, as illustrated in FIG. 4. Further, the dilation process section 14c inputs, to the signal processing circuit 50, an input signal 2 that is the segmentation class signal having been subjected to the dilation process.

The dilation process section 14c carries out a dilation process by regarding the inputted segmentation class signal as binary data (binary image data) indicative of whether it belongs to a text region or not. That is, when the target pixel belongs to the text region, the dilation process in which a value of the target pixel is set to "1" is carried out. When the target pixel does not belong to the text region, the dilation process in which the value of the target pixel is set to "0" is carried out. After the dilation process, there is outputted a segmentation class signal that reflects the result of the dilation process and that indicates which of a text region, a halftone dot region, a photograph region, and page background region each pixel belongs to. More specifically, a pixel regarded as having a pixel value 1 in the dilation process is regarded as belonging to the text region, and a pixel regarded as having a pixel value 0 in the dilation process is regarded as belonging to a region (one of the halftone dot region, the photograph region, and the page background region) indicated by the segmentation class signal received by the dilation process section 14c.

Figure 5:
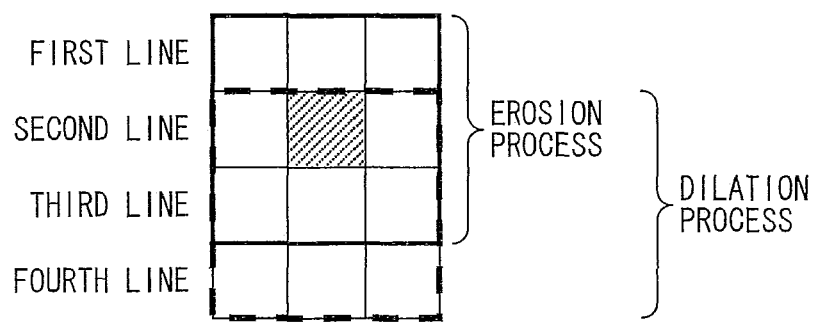
FIG. 5 is an explanatory view illustrating a relation between a target pixel and reference pixels observed in a dilation process and an erosion process that are carried out by the image processing apparatus illustrated in FIG. 2.

The erosion process section 14d receives, via the signal processing circuit 50, the segmentation class signal having been subjected to the dilation process by the dilation process section 14. With respect to each pixel, the erosion process section 14d carries out an erosion process in which when at least one pixel judged as belonging to a page background region exists in 8 pixels around a target pixel, the target pixel is regarded as belonging to a page background region. For example, as illustrated in FIG. 5, the dilation process is carried out with respect to a target pixel on a third line on the basis of image data corresponding to second to fourth lines, and then the erosion process is carried out with respect to a target pixel in the second line on the basis of image data corresponding to first to third lines having been subjected to the dilation process. When a pixel belonging to the halftone dot region exists in 8 pixels around the target pixel, the erosion process section 14d does not change the result of the judgment of the target pixel (does not carry out the erosion process). This is intended for avoiding deletion of text when the text exists on halftone dots (e.g. map). The segmentation class signal having been subjected to the erosion process is outputted to the black generation and under color removal process section 16, the spatial filter process section 17, and the tone reproduction process section 19.

The erosion process section 14d carries out the erosion process by regarding the inputted segmentation class signal as binary data (binary image data) indicative of whether it belongs to a page background region or not. That is, when the target pixel belongs to the page background region, the erosion process in which a value of the target pixel is set to "1" is carried out. When the target pixel does not belong to the page background region, the erosion process in which a value of the target pixel is set to "0" is carried out. After the erosion process, there is outputted a segmentation class signal that reflects the result of the erosion process and that indicates which of a text region, a halftone dot region, a photograph region, and page background region each pixel belongs to. More specifically, a pixel regarded as having a pixel value 1 in the erosion process is regarded as belonging to the page background region, and a pixel regarded as having a pixel value 0 in the erosion process is regarded as belonging to a region (one of the text region, the halftone dot region, and the photograph region) indicated by the segmentation class signal received by the erosion process section 14d.

Consequently, it is possible to correct the segmentation class signal so that an isolated point (noise) of a pixel that exists in a text region but that does not belong to the text region, deriving from error in reading an image, is removed. In the present embodiment, the dilation process by the dilation process section 14c is carried out before the erosion process by the erosion process section 14c. Alternately, the dilation process by the dilation process section 14c may be carried out after the erosion process by the erosion process section 14c. The latter case allows removing an isolated point (noise) of a pixel that exists in a page background region but that belongs to a text region, deriving from error when reading an image.

The segmentation class signal is obtained as a result of judgment with respect to each pixel. Therefore, when there are provided four signal processing circuits 50 corresponding to C, M, Y, and K, respectively, it is suffice that one of the four signal processing circuits 50 carries out the dilation process and the erosion process.

The signal processing circuit 50 selectively (alternately) carries out (1) a process for outputting, to the spatial filter process section 17, each predetermined amount of image data (e.g. 7 pixels in main scanning direction×7 lines in sub scanning direction) from the black generation and under color removal section 16 (filter process mode) and (2) a process for outputting, to the dilation process section 14c, each predetermined amount of a segmentation class signal (e.g. 3 pixels in main scanning direction and 3 lines in sub scanning direction) from the segmentation process section 14 in the segmentation class signal correction section 14b and for outputting the segmentation class signal having been subjected to the dilation process from the dilation process section 14c to the erosion process section 14d (segmentation class signal correction mode).

The color image processing apparatus 10 includes first storage means (not shown) for temporarily storing image data from the black generation and under color removal section 16, and second storage means (not shown) for temporarily storing a segmentation class signal from the segmentation process section 14. When carrying out the process (1) (filter process mode), the main control section inputs the image data stored in the first storage means into the signal processing circuit 50. When carrying out the process (2) (segmentation class signal correction mode), the main control section inputs the segmentation class signal stored in the second storage means into the signal processing circuit 50.

The following specifically explains an arrangement of the signal processing circuit 50. As illustrated in FIG. 1, the signal processing circuit 50 includes input ports Pi1 to Pi4, a clock gate section 51, a switch 52, a delay adjustment section 53, a delay adjustment section 54, line buffer circuits LB1 to LB6, and output ports Po1 to Po3.

The delay adjustment section 53 delays (i) an input signal 1 (in the filter process mode, image data from the black generation and under color removal section 16; in the segmentation class signal correction mode, a segmentation signal from the segmentation process section 14) corresponding to 1 line that is inputted from the input port Pi1 and (ii) an enable signal 1 inputted from the main control section so that the input signal 1 and the enable signal 1 are synchronized with signals outputted from the below-described line buffer circuits (in the filter process mode, the line buffer circuits LB1 to LB6; in the segmentation class signal correction mode, at least the line buffer circuits LB1 and LB2), and outputs the input signal 1 and the enable signal 1 that are thus delayed to the output ports Po1 and Po2. The output port Pot is connected with the spatial filter process section 17, and the output port Po2 is connected with the dilation process section 14c.

Figure 6:
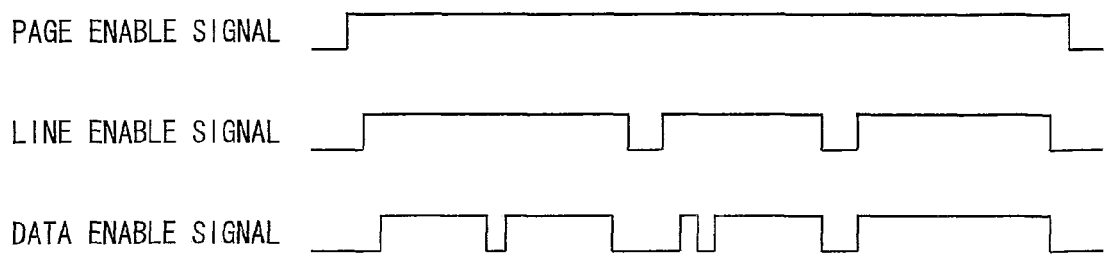
FIG. 6 is a signal waveform chart illustrating enable signals used in the image processing apparatus in FIG. 2.

The enable signal includes three control signals: a page enable signal indicative of an effective period for one page; a line enable signal indicative of an effective period for one line; and a data enable signal indicative of effectiveness/ ineffectiveness of data. The signal processing circuit 50, the spatial filter process section 17, and the segmentation class signal correction section 14b carry out controls according to the enable signal. FIG. 6 is a timing chart illustrating timings of the three enable signals. The asserted period of the page enable signal (period in which the page enable signal is at a high level) indicates one page of an image. The asserted period of the line enable signal indicates one line. The asserted period of the data enable signal indicates one data.

The delay adjustment section 54 delays an input signal 2 (segmentation class signal having been subjected to the dilation process by the dilation process section 14c) inputted via the switch 52 and an enable signal 2 so that the input signal 2 and the enable signal 2 are synchronized with signals outputted from the line buffer circuits LB3 and LB4, and outputs the input signal 2 and the enable signal 2 that are thus delayed to the output port Po3. The output port Po3 is connected with the erosion process section 14d.

In response to a switch signal inputted from the input port Pi3 from the main control section, the switch 52 switches connection states of individual members of the signal processing circuit 50 between (1) a state intended for outputting image data to the spatial filter process section 17 (filter process mode) and (2) a state intended for outputting a segmentation class signal to the segmentation class signal correction section 14b (segmentation class signal correction mode).

Specifically, in the filter process mode (e.g. when the switch signal is "0"), the switch 52 inputs image data and an enable signal from the line buffer circuit LB2 into the line buffer circuit LB3. In this case, the line buffer circuits LB1 to LB6 and the delay adjustment section 53 serve as seven line buffers that output image data corresponding to seven lines in sub scanning direction, inputted from the black generation and under color removal section 16, in such a manner that the image data are synchronized with each other.

On the other hand, in the segmentation class signal correction mode (e.g. when the switch signal is "1"), the switch 52 inputs the segmentation class signal (input signal 2) having been subjected to the dilation process and the enable signal 2, both of which signals are inputted from the dilation process section 14c via the input port Pi2, into the line buffer circuit LB3. In this case, the line buffer circuits LB1 and LB2 and the delay adjustment section 53 serve as three line buffers that output segmentation class signals inputted from the segmentation process section 14, in such a manner that the segmentation class signals are synchronized with one another. The line buffer circuits LB3 and LB4 and the delay adjustment section 54 serve as three line buffers that output segmentation class signals inputted from the dilation process section 14c, in such a manner that the segmentation class signals having been subjected to the dilation process are synchronized with one another.

In response to a switch signal (register signal) inputted from the input port Pi3 from the main control section, the clock gate section 51 blocks inputs of clock signals into the line buffer circuits LB5 and LB6 during a period when the segmentation class signal correction mode is selected, and stops operations of the line buffer circuits LB5 and LB6. That is, since the line buffer circuits LB5 and LB6 are not used in the segmentation class signal correction mode, inputs of clock signals into the line buffer circuits LB5 and LB6 are blocked, so that the operations of the line buffer circuits LB5 and LB6 are stopped. This reduces power consumption.

In the present embodiment, image data corresponding to 7 lines are used in the spatial filter process. However, the present invention is not limited to this. For example, in a case of using image data corresponding to 15 lines, the signal processing circuit 50 is arranged to include line buffer circuits for 14 lines. In this case, the dilation process and the erosion process require line buffer circuits for 4 lines in total, and therefore it is possible to stop supply of a clock signal to 10 line buffer circuits in the segmentation class signal correction mode. This allows further reducing power consumption. Further, in the present embodiment, a text region is subjected to the dilation process and a page background region is subjected to the erosion process. However, the present invention is not limited to this, and may be arranged so that a text region and a photograph region are subjected to the dilation process and a page background region is subjected to the erosion process. In this case, the dilation process and the erosion process require line buffer circuits for 8 lines in total. When using image data corresponding to 15 lines, it is possible to stop supply of a clock signal to 6 line buffer circuits in the segmentation class signal correction mode.

In the present embodiment, operation of the clock gate section 51 is controlled in response to a switch signal for switching operation of the switch 52. Alternatively, a signal (register signal) different from the switch signal may be used.

Figure 7:
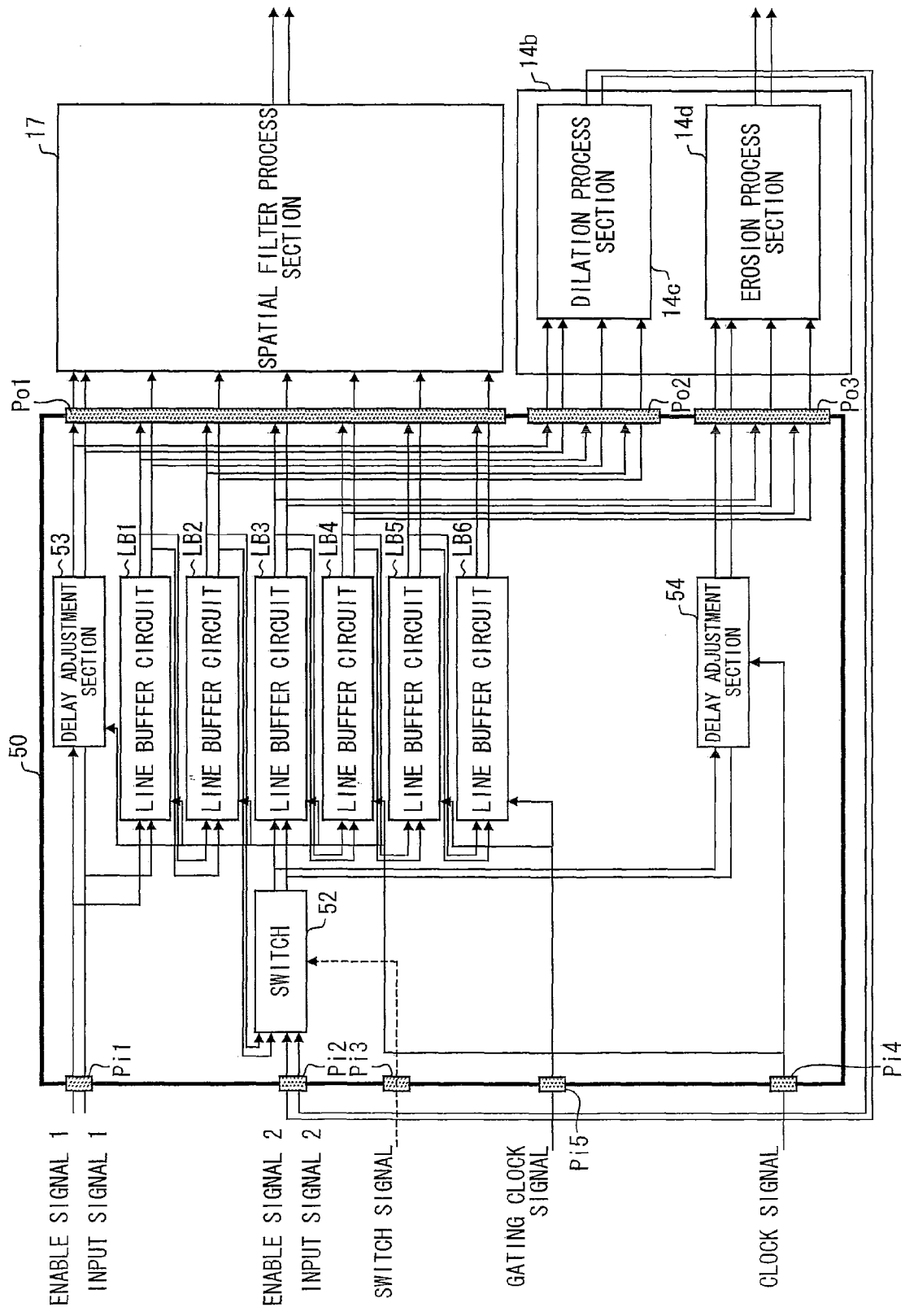
FIG. 7 is a block diagram illustrating a modification example of the signal processing circuit in FIG. 1.

In the present embodiment, inputting/blocking of a clock signal into the line buffer circuits LB5 and LB6 are controlled by the clock gate section 51, but the present invention is not limited to this. For example, as illustrated in FIG. 7, the present invention may be arranged so that the clock gate section 51 is omitted, and a signal (gating clock signal) different from clock signals to the line buffer circuits LB1 to LB4 are used as clock signals to be inputted to the line buffer circuits LB5 and LB6, and switching means (not shown) provided outside the signal processing circuit 50 prevents a gating clock signal from being inputted into the signal processing circuit 50 during a period in which the segmentation class signal correction mode is selected.

Each of the line buffer circuits LB1 to LB6 temporarily stores an input signal corresponding to 1 line, and outputs the signal with predetermined timing. Output terminals of the line buffer circuits LB1 and LB2 are connected with the output ports Po1 and Po2, output terminals of the line buffer circuits LB3 and Lb4 are connected with the output ports Po1 and Po3, and output terminals of the line buffer circuits LB5 and LB6 are connected with the output port Po1. The line buffer circuits LB1 to LB6 are detailed later.

Consequently, in the case of the filter process mode, image data corresponding to a first line that is inputted from the black generation and under color removal section 16 and an enable signal inputted from the main control section are inputted to the line buffer circuit LB1, image data corresponding to a second line and an enable signal are inputted to the line buffer circuit LB2, image data corresponding to a third line and an enable signal are inputted to the line buffer circuit LB3, image data corresponding to a fourth line and an enable signal are inputted to the line buffer circuit LB4, image data corresponding to a fifth line and an enable signal are inputted to the line buffer circuit LB5, image data corresponding to a sixth line and an enable signal are inputted to the line buffer circuit LB6, and image data corresponding to a seventh line and an enable signal are inputted to the delay adjustment section 53. The image data corresponding to the respective lines and the enable signals are outputted to the spatial filter process section 17 via the output port Po1 with their timings synchronized.

In the case of the segmentation class signal correction mode, a segmentation class signal corresponding to the first line that is inputted from the segmentation process section 14 and an enable signal inputted from the main control section are inputted to the line buffer circuit LB1, a segmentation class signal corresponding to the second line and an enable signal are inputted to the line buffer circuit LB2, and a segmentation class signal corresponding to the third line and an enable signal are inputted to the delay adjustment section 53. The segmentation class signals corresponding to the respective lines are outputted to the dilation process section 14c via the output port Po2 in synchronization with each other. Further, segmentation class signals having been subjected to the dilation process, that are outputted from the dilation process section 14c, and enable signals are inputted as follows; a segmentation class signal corresponding to the first line and an enable signal are inputted to the line buffer circuit LB3, a segmentation class signal corresponding to the second line and an enable signal are inputted to the line buffer circuit LB4, and the segmentation class signal corresponding to the third line and an enable signal are inputted to the delay adjustment section 54. These segmentation class signals corresponding to the respective lines and the enable signals are outputted to the erosion process section 14d via the output port Po3 in synchronization with each other.

In a case where the enable signal is indicative of the filter process mode, the spatial filter process section 17 carries out a filter process, whereas in a case where the enable signal is indicative of the segmentation class signal correction mode, the spatial filter process section 17 does not carry out the filter process even when image data is inputted. Whether the enable signal is indicative of the filter process mode or the segmentation class signal correction mode may be determined according to the length of a period in which the data enable signal is asserted (period in which the data enable signal is at a high level). Further, in addition to the three kinds of enable signals mentioned above, an enable signal indicative of whether the mode is the filter process mode or the segmentation class signal correction mode may be used.

In the case where the enable signal is indicative of the segmentation class signal correction mode, the dilation process section 14c carries out the dilation process, whereas in the case where the enable signal is indicative of the filter process mode, the dilation process section 14c does not carry out the dilation process even when the segmentation class signal is inputted. Similarly, in the case where the enable signal is indicative of the segmentation class signal correction mode, the erosion process section 14d carries out the erosion process, whereas in the case where the enable signal is indicative of the filter process mode, the erosion process section 14d does not carry out the erosion process even when the segmentation class signal is inputted. However, the present invention is not limited to this, and may be arranged so that in the case where the enable signal is indicative of the segmentation class signal correction mode, image data is not outputted from the output port Po1 to the spatial process section 17, whereas in the case where the enable signal is indicative of the filter process mode, a segmentation class signal is not outputted from the output port Po2 to the dilation process section 14c and a segmentation class signal is not outputted from the output port Po3 to the erosion process section 14d.

(3. Line Buffer Circuits LB1 to LB6)

Figure 8:
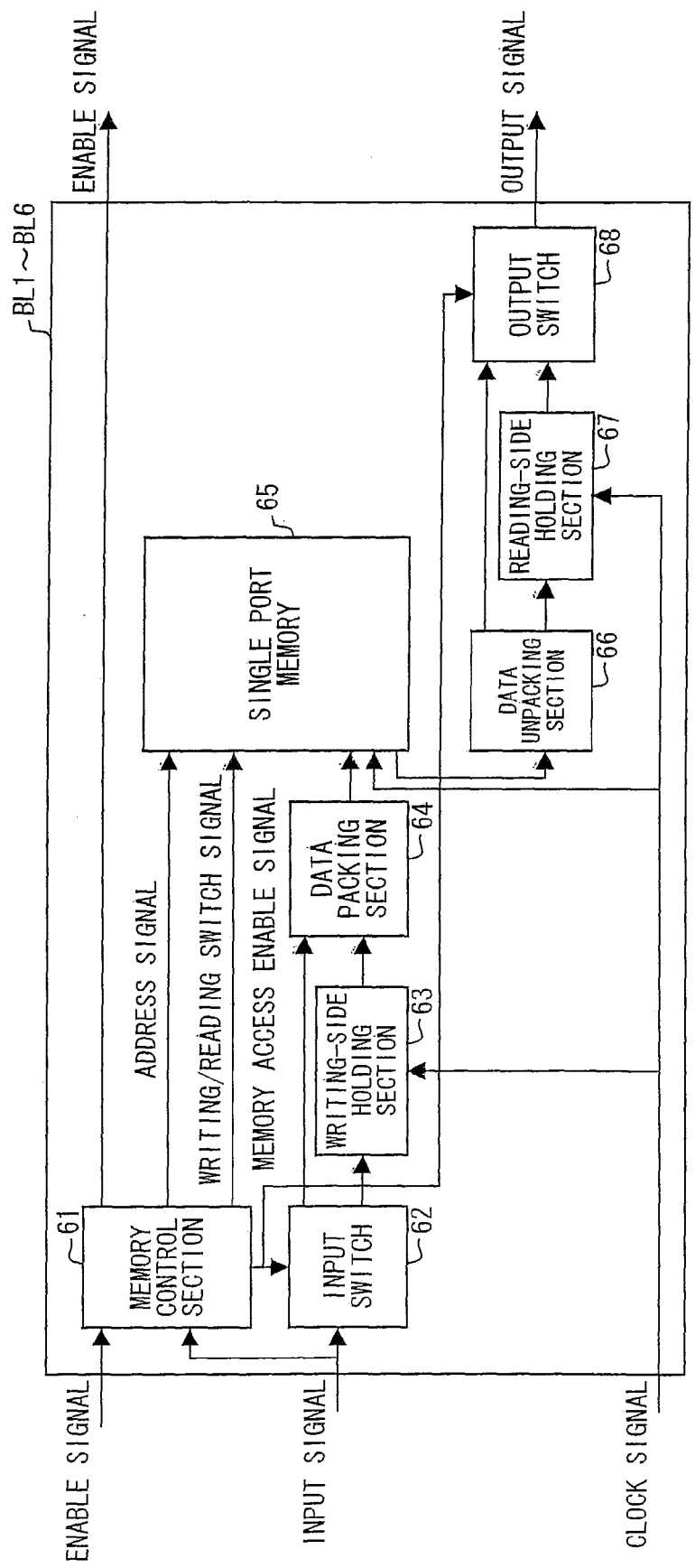
FIG. 8 is a block diagram illustrating a line buffer circuit included in the signal process circuit illustrated in FIG. 1.

The following explains an arrangement of the line buffer circuits LB1 to LB6. FIG. 8 is a block diagram illustrating the arrangement of the line buffer circuit LB1. Note that the line buffer circuits LB2 to LB6 have the same arrangement as that of the line buffer circuit LB1.

As illustrated in FIG. 8, the line buffer circuit LB1 includes a memory control section 61, an input switch 62, a writing-side holding section 63, a data packing section 64, a single port memory 65, a data unpacking section 66, a reading-side holding section 67, and an output switch 68.

The single port memory 65 is a single port memory in which an input signal (image data or a segmentation class signal) corresponding to 1 line is stored.

In response to an enable signal, the memory control section 61 generates control signals for controlling individual sections of the line buffer circuit LB1, i.e. an address signal indicative of an address with which data is written into, or with which data is read from, the single port memory 65; a writing/reading switch signal for switching between a writing process and a reading process with respect to the single port memory 65 (memory writing enable signal, memory reading enable signal); and a memory access enable signal indicative of effectiveness/ineffectiveness of an access to the single port memory 65.

The input switch 62 is a switch for switching destinations of an input signal between data in odd number and data in even number in accordance with the control signal inputted from the memory control section 61. Specifically, the input switch 62 outputs an input signal in odd number (pixel in odd number) to the writing-side holding section 63, and outputs an input signal in even number (pixel in even number) to the data packing section 64.

The writing-side holding section 63 temporarily stores an input signal in odd number that is inputted from the input switch 62. The writing-side holding section 63 is made of a flip-flop for example.

The data packing section 64 packs (i) an input signal in odd number that is held by the writing-side holding section 63 with (ii) an input signal in even number that is inputted from the input switch 62.

The data unpacking section 66 unpacks data read out from the single port memory 65 into data in odd number and data in even number, reads out the data in even number and outputs the data to the reading-side holding section 67, and outputs the data in odd number to the output switch 68.

The reading-side holding section 67 temporarily stores data in even number that is inputted via the data unpacking section 66. The reading-side holding section 67 is made of a flip-flop for example.

In response to the control signal from the memory control section 61, the output switch 68 appropriately selects data in odd number inputted from the output switch 68 and data in even number inputted from the reading-side holding section 67 so that the data are outputted in the same order as the order when the data were inputted to the input switch 62 (FIFO; First-in-First-out).

Figure 9:
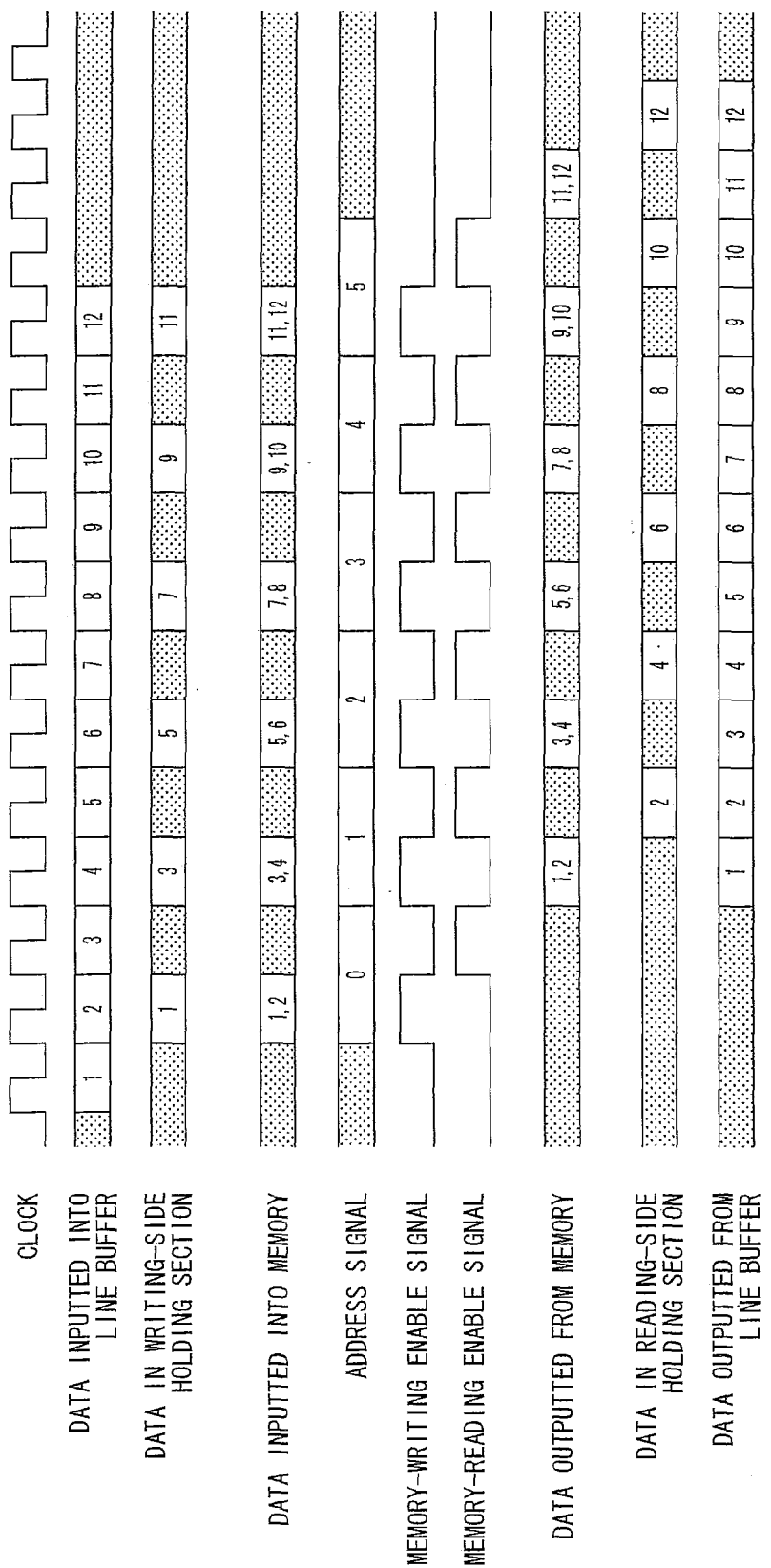
FIG. 9 is a signal waveform chart illustrating signals processed in the line buffer circuit in FIG. 8.

FIG. 9 is a timing chart illustrating a process of writing data corresponding to 12 pixels in 1 line into the single port memory 65, and a process of reading the data from the single port memory 65.

When data in odd number is inputted, the memory control section 61 causes the data in odd number to be transmitted from the input switch 62 to the writing-side holding section 63, and causes the data to be temporarily stored in the writing-side holding section 63.

Thereafter, when data in even number is inputted next to the data in odd number, the memory control section 61 causes the data in even number to be transmitted from the input switch 62 to the data packing section 64, and causes the data in odd number that has been temporarily stored in the writing-side holding section 63 to be transmitted to the data packing section 64.

Subsequently, the memory control section 61 causes the data packing section 64 to pack the data in odd number that has been inputted from the writing-side holding section 63 with the data in even number that has been inputted from the input switch 62. Then, the memory control section 61 outputs an address signal indicative of an address with which the data is written and a memory writing enable signal for enabling a writing operation, and causes the data packed by the data packing section 64 to be written in the single port memory 65.

Thus, the data corresponding to two pixels are written by one access to the single port memory 65.

Further, when reading out the data written in the single port memory 65, the memory control section 61 outputs an address signal indicative of an address of data to be read and a memory reading enable signal for enabling a reading operation, and reads data corresponding to 2 pixels at a time and sends the data to the data unpacking section 66.

The memory control section 61 causes the data corresponding to a pixel in odd number out of the data corresponding to 2 pixels that are read from the single port memory 65 to be outputted from the data unpacking section 66 to the output switch 68, and causes the data corresponding to a pixel in even number to be outputted to the reading-side holding section 67 and stored there. Further, the memory control section 61 causes the data of a pixel in even number that is stored in the reading-side holding section 67 to be outputted from the reading-side holding section 67 to the output switch 68 in accordance with timing of output of the data of a pixel in odd number from the output switch 68.

Further, the memory control section 61 controls operation of the output switch 68 so that the data of a pixel in odd number that is inputted from the data unpacking section 66 is outputted and then the data of a pixel in even number that is inputted from the reading-side holding section 67 is outputted.

Thus, the data corresponding to two pixels are read out by one access to the single port memory 65. A time from writing data in the single port memory 65 to starting of reading the data is set differently with respect to each line buffer circuit so that timings of outputs from the individual line buffer circuits are synchronized.

Thus, in the present embodiment, writing of data corresponding to two pixels and reading of data corresponding to two pixels are carried out alternately. That is, data corresponding to two pixels are read out from the single port memory 65 with timing of input of data in odd number to the line buffer circuit, and data corresponding to two pixels are written into the single port memory 65 with timing of input of data in even number to the line buffer circuit.

This allows a high-speed FIFO process in the single port memory 65. A single port memory has only one terminal for accessing a memory, and therefore only one of writing and reading can be carried out in one cycle (one access). Consequently, when carrying out a writing process and a reading process, conventional arts require two times as many accesses as the number of pixels (the number of data). In contrast thereto, the present embodiment is designed such that data is written in or read out with respect to two pixels so that the number of accesses is reduced to half of the number of accesses in the conventional arts, and that data in odd number is inputted in the line buffer circuit and then read out from the single port memory 65 before data in even number is inputted, so that the process time for writing and reading can be reduced to half of that of the conventional arts.

In the example of FIG. 9, an explanation was made as to a case where data is written into or read out from the single port memory 65 with respect to every two pixels. However, the number of pixels (the number of data) to be written into or read out from the single port memory 65 in each access is not limited to two.

Figure 10:
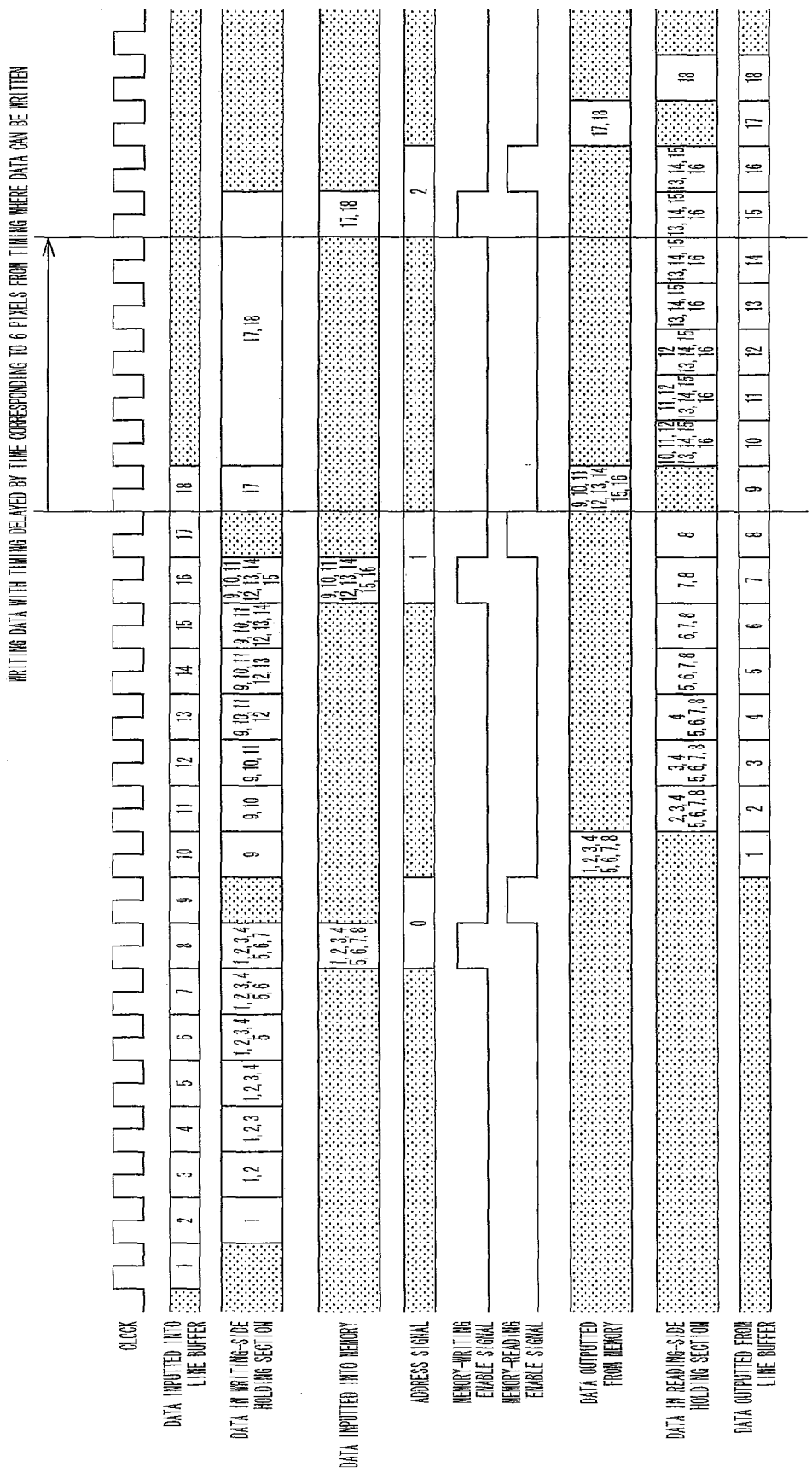
FIG. 10 is a signal waveform chart illustrating signals processed in the line buffer circuit in FIG. 8.

FIG. 10 is a timing chart in a case where the number of pixels (the number of data) to be written into or read out in one access is 8. In this case, data corresponding to first to seventh pixels are temporarily stored in the writing-side holding section 63, and when data corresponding to an eighth pixel is inputted, the data corresponding to 8 pixels are packed by the data packing section 64 so that the data are written into the single port memory 65 in one access.

Further, while data corresponding to first to seventh pixels are inputted, data corresponding to 8 pixels are read out from the single port memory 65 in one access. Out of the data corresponding to 8 pixels thus read out, the data corresponding to first pixel is transmitted from the data unpacking section 66 to the output switch 68 and outputted, and the data corresponding to second to eighth pixels are temporarily stored in the reading-side holding section 67 and then the data is transmitted one by one to the output switch 68 and outputted there, in the order of the data corresponding to second pixel and thereafter.

Thus, by increasing the number of pixels to be written into or read out in one access, it is possible to reduce the number of accesses to the single port memory 65. However, as the number of pixels to be written into or read out in one access increases, the amount of data held by the writing-side holding section 63 and the reading-side holding section 67 increases and management of data outputted from the output switch 68 gets complicated. Therefore, it is preferable that the number of pixels to be written into or read out in one access is set appropriately in accordance with capacities of the writing-side holding section 63 and the reading-side holding section 67, performance of the memory control section 61, etc.

Figure 11:
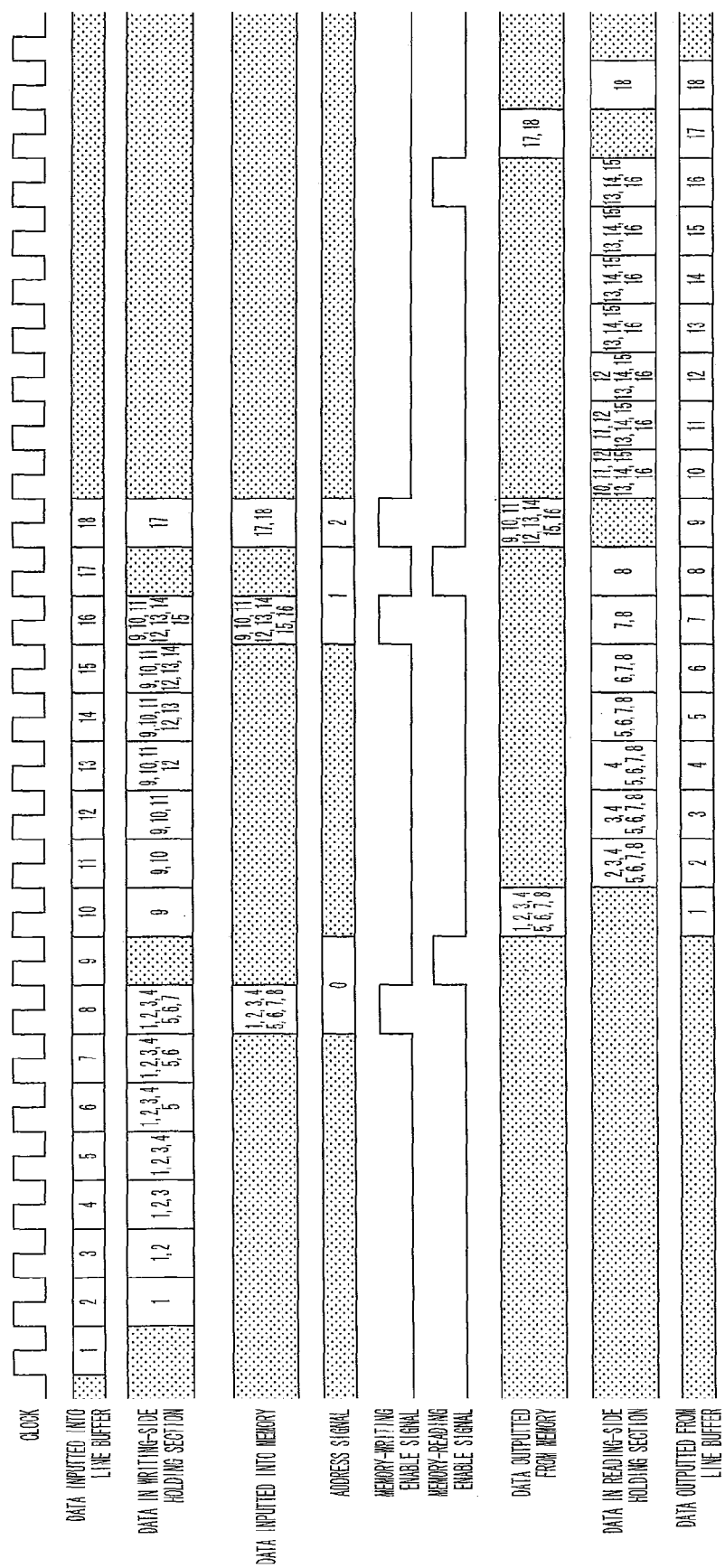
FIG. 11 is a signal waveform chart illustrating signals processed in the line buffer circuit in FIG. 8.

FIG. 10 illustrates an example in a case where one line consists of data corresponding to 18 pixels. Although data corresponding to seventeenth and eighteenth pixels can be written in the single port memory 65 at the time when the two data are inputted, the two data are written with timing delayed by a time required for inputting data corresponding to 6 pixels after the input of the data corresponding to eighteenth pixel, in order to cause the input of the two data to be in accordance with timing of reading data corresponding to other pixels from the single port memory 65. However, the present invention is not limited to this and may be arranged so that data corresponding to seventeenth and eighteenth pixels are written into the single port memory 65 when the data corresponding to the eighteenth pixel are inputted, as illustrated in FIG. 11 for example.

As described above, the digital color multifunctional peripheral 1 according to the present embodiment is designed such that it includes the line buffer circuits LB1 to LB6 and the delay adjustment section 53, and when the spatial filter process is carried out, (i) image data corresponding to 6 lines that are stored in the line buffer circuits LB1 to LB6 respectively and (ii) image data corresponding to 1 line that is supplied to the delay adjustment section 53 are caused to be outputted to the spatial filter process section 17 in synchronization with each other, and when the dilation process is carried out, (i) image data corresponding to 2 lines that are stored in the line buffer circuits LB1 and LB2 and (ii) image data corresponding to 1 line that is supplied to the delay adjustment section 53 are caused to be outputted to the dilation process section 14c in synchronization with each other.

This allows reducing the size of a circuit, compared with a case where signal processing sections for the spatial filter process section 17 and the dilation process section 14c are separately provided.

Further, in a case where the erosion process is carried out after the dilation process, out of image data corresponding to 3 lines having been subjected to the dilation process, image data corresponding to 2 lines are inputted to the line buffer circuits LB3 and LB4 and the delay adjustment section 54, and the image data corresponding to 3 lines are outputted to the erosion process section 14d in synchronization with each other.

This allows reducing the size of a circuit, compared with a case where signal processing sections for the first image process section, the dilation process section 14c, and the erosion process section 14d are separately provided.

In the present embodiment, an explanation was made as to a case where the present invention is applied to a digital multifunction printer. However, application of the present invention is not limited to this. For example, the present invention may be applied to a monochrome multifunction printer. Further, the present invention may be applied to an apparatus including one of a copier function, a printer function, a facsimile transmission function, a scan to e-mail function etc., and may be an apparatus including at least two of these functions.

For example, a communication device including a modem or a network card may be added to the arrangement of the digital color multifunction printer 1 in order to allow facsimile transmission. In this case, when carrying out facsimile transmission, the digital color multifunction printer 1 causes the communication device to carry out a transmission procedure with a destination to secure a state where transmission can be carried out, and then the digital color multifunction printer 1 reads out, from the memory, image data encoded in a predetermined format (image data scanned by a scanner) and carries out necessary processing such as conversion of the encoding format, and then sequentially transmits the image data via a communication line to the destination.

Further, when carrying out facsimile reception, the digital color multifunction printer 1 causes the communication device to carry out a communication procedure and receives the image data from an originating communication device so as to input the image data to the color image processing apparatus 10. The color image processing apparatus 10 subjects the received image data to an encoding/decoding process, a rotation process, a rotation process, and a resolution conversion process if necessary, and is subjected to an output tone correction process and a tone reproduction process, and is output from the color image output apparatus 30.

Further, the digital color multifunction printer 1 may carry out, via a network card and a LAN cable, data communications with a computer or other digital multifunction printer connected with a network.

Second Embodiment

The following describes another embodiment of the present invention. For convenience of explanation, members having the same functions as those explained in First Embodiment are given the same signs as First Embodiment, and explanations thereof are omitted here.

Figure 12:
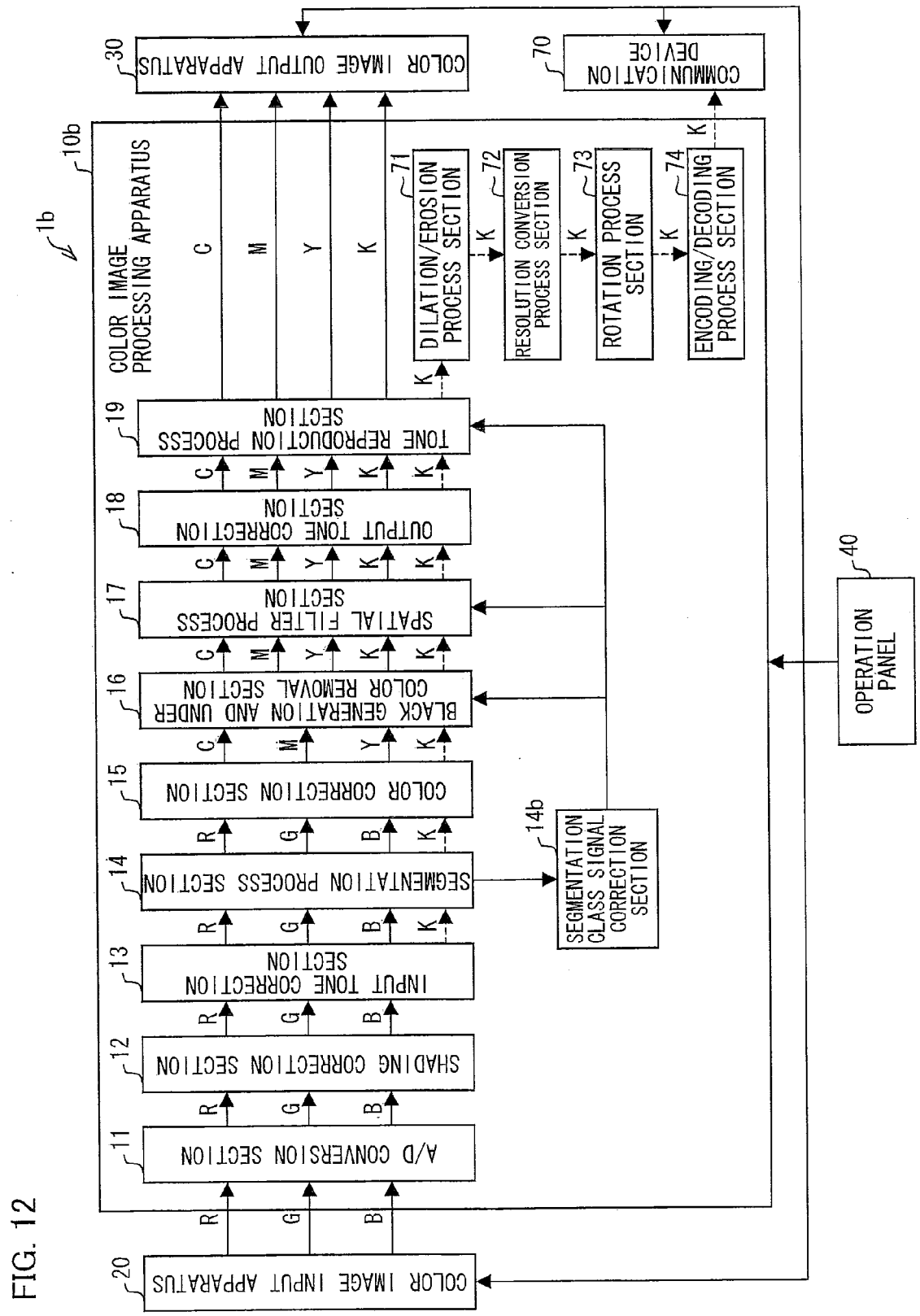
FIG. 12 is a block diagram schematically illustrating an arrangement of an image processing apparatus according to another embodiment of the present invention.

FIG. 12 is a block diagram schematically illustrating an arrangement of a digital color multifunctional peripheral 1b according to the present embodiment. As illustrated in FIG. 12, the digital color multifunctional peripheral 1b includes a color image processing apparatus 10b instead of the color image processing apparatus 10 included in the digital color multifunctional peripheral 1 of First Embodiment. Further, in addition to the arrangement of the digital color multifunctional peripheral 1 of First Embodiment, the digital color multifunctional peripheral 1b is provided with a communication device 70.

The color image processing apparatus 10b includes a dilation/erosion process section 71, a resolution conversion process section 72, a rotation process section 73, and an encoding/decoding process section 74, in addition to the arrangement of the digital color multifunctional peripheral 1 of First Embodiment.

When carrying out facsimile transmission/reception (when a mode for facsimile transmission is selected or when a reception signal of a facsimile is received), the color image processing apparatus 10b carries out processes by an input tone correction section 13b and thereafter in a manner partially different from that of First Embodiment. FIG. 12 illustrates, by use of a broken line, a flow of data when carrying out facsimile transmission/reception. The following explains a process when carrying out facsimile transmission/reception.

An A/D conversion section 11 converts color analog signals into digital signals.

A shading correction section 12 removes, from the digital color signals from the A/D conversion section 11, various distortions produced in an illumination system, an image focusing system, and an image sensing system when reading an image.

The input tone correction section 13b corrects non-linearity of tones of image data having been subjected to the shading correction process (converts the image data into density data). This process is carried out with reference to a LUT (Look Up Table) for example. Further, color image data is converted into a luminance signal (K) by use of matrix calculation for example.

A segmentation process section 14 separates each pixel of image data from the input tone correction section into either one of a text region, a halftone dot region, or a photograph (continuous tone) region. On the basis of a result of the separation, the segmentation process section 14 outputs a segmentation class signal, indicating which region a pixel of the image data belongs to, to a spatial filter process section 17 and a tone reproduction process section 19 through a segmentation class signal correction section 14b. When carrying out facsimile transmission/reception, the segmentation class signal correction section 14b outputs a segmentation class signal as received from the segmentation process section 14 to the spatial filter process section 17 and the tone reproduction process section 19 without any modification. Alternatively, when carrying out facsimile transmission/reception, the segmentation process section 14 does not carry out the segmentation process section. Further, the segmentation process section 14 outputs the signal from the input tone correction section 13b to the subsequent spatial filter process section 17 without any modification.

When carrying out facsimile transmission/reception, a color correction section 15 and a black generation and under color removal section 16 do not carry out the color correction process and the black generation and under color removal process, and output input data to the spatial filter process section 17 without any modification.

With the use of a digital filter, the spatial filter process section 17 carries out a spatial filter process on the basis of a segmentation class signal, with respect to image data outputted from the segmentation process section 14. In the spatial filter process, the spatial filter process section 17 corrects a spatial frequency characteristic, so as to reduce blur or granularity deterioration in an output image. The spatial filter process is carried out in a manner similar to that of First Embodiment.

When carrying out facsimile transmission/reception, an output tone correction section 18 outputs input data to the tone reproduction process section 19 without any modification.

The tone reproduction process section 19 converts 8-bit image data in each pixel output from the spatial filter process section 17 into binary image data by use of an error diffusion method. This process is carried out according to a segmentation class signal output from the segmentation process section 14. For example, a region separated by the segmentation process section 14 into a text region is subjected to a binarization process suitable for reproduction of high frequency. A region separated by the segmentation process section 14 into a photograph region is subjected to a binarization process suitable for tone reproduction.

The dilation/erosion process section 71 carries out the dilation process/erosion process on binary image data from the tone reproduction process section 19 so as to remove noises. Methods for the dilation process and the erosion process are the same as the methods employed in the dilation process section 14c and the erosion process section 14d in First Embodiment.

The resolution conversion process section 72 subjects image data to the resolution conversion process if necessary. The rotation process section 73 subjects image data to the rotation process if necessary. The encoding/decoding process section 74 encodes image data in a predetermined format and temporarily stores the image data in a memory (not shown).

When carrying out facsimile transmission/reception, the main control section sets a value indicative of a transmission/reception mode of a facsimile in a register (not shown). Further, the main control section generates a switch signal for switching the signal processing circuit 50 between a state for outputting image data to the spatial filter process section 17 (filter process mode) and a state for outputting image data to the dilation/erosion process section 71 (dilation/erosion process mode), and outputs the switch signal to the signal processing circuit 50. The operation of the signal processing circuit 50 is substantially the same as that in First Embodiment and explanation thereof is omitted here.

The communication device 70 carries out communications with other device connected with the digital color multifunction printer 1b via a communication line. In the present embodiment, facsimile transmission/reception is carried out via the communication device 70.

When carrying out facsimile transmission, the main control section causes the communication device 70 to carry out a transmission procedure with a destination to secure a state where transmission can be carried out, and then the main control section reads out, from the memory, image data encoded in a predetermined format and carries out necessary processing such as conversion of the encoding format, and then sequentially transmits the image data from the communication device 70 to the destination via a communication line.

Further, when carrying out facsimile reception, the main control section causes the communication device 70 to carry out a communication procedure and receives the image data encoded in the predetermined format from an originating communication device so as to input the image data to the color image processing apparatus 10b. Further, the main control section causes the encoding/decoding process section 74 to carry out the decoding process on the image data so as to reproduce a document image that has been transmitted as a page image. Further, the main control section controls the resolution conversion process section 72 and the rotation process section 73 so that they carry out the resolution conversion process and the rotation process, respectively, on the document image in accordance with the specification of the color image output apparatus 30, and the document image is outputted to the color image output apparatus 30. Since data transmitted via facsimile has been binarized, the data is outputted to the color image output apparatus 30. The color image output apparatus 30 forms an image on a recording material according to image data of the document image.

As described above, the digital color multifunctional peripheral 1b according to the present embodiment includes line buffer circuits LB1 to LB6 and the delay adjustment section 53. When carrying out the spatial filter process, (i) image data corresponding to 6 lines that are stored in the line buffer circuits LB1 to LB6 and (ii) image data corresponding to 1 line that is supplied to the delay adjustment section 53 are caused to be outputted to the spatial filter process section 17 in synchronization with each other. When carrying out the dilation process, (i) image data that are corresponding to 2 lines respectively stored in the line buffer circuits LB1 and LB2 and (ii) image data corresponding to 1 line that is supplied to the delay adjustment section 53 are caused to be outputted to the dilation process section 14c in synchronization with each other.

This yields substantially the same effect as the effect yielded by the digital color multifunction printer 1 of First Embodiment.

In the above embodiments, an explanation was made as to a case where image data from the signal processing circuit 50 is subjected to the spatial filter process (first process) and the dilation/erosion process (second process). However, the present invention is not limited to this, and may be applied to an image processing apparatus including a plurality of image processing sections each carrying out an image process by use of image data with different number of lines. For example, at least two of a filter process, a segmentation process, a rotation process, a zooming process, and a labeling process (a process for giving to a target pixel a label indicative of a characteristic of the target pixel on the basis of a relationship between the pixel value of the target pixel and pixels values of adjacent pixels) may be carried out by use of an output from the signal processing circuit 50.

Third Embodiment

The following describes further another embodiment of the present invention. Note that members having the same functions as those explained in the foregoing embodiments are given the same signs as the foregoing embodiments, and explanations thereof are omitted here.

Figure 13:
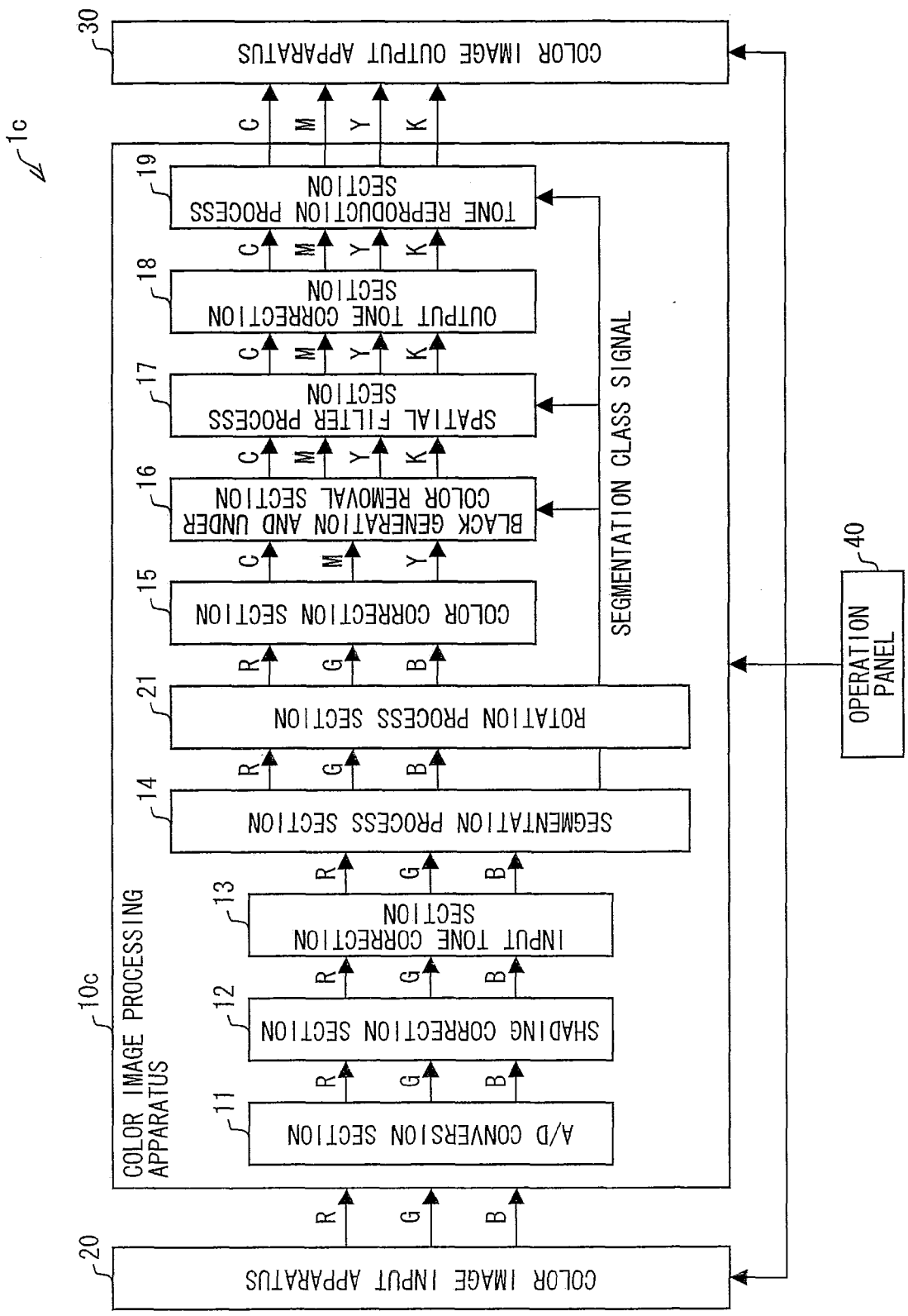
FIG. 13 is a block diagram schematically illustrating an arrangement of an image processing apparatus according to further another embodiment of the present invention.

FIG. 13 is a block diagram schematically illustrating an arrangement of a digital color multifunctional peripheral 1c according to the present embodiment. As illustrated in FIG. 13, the digital color multifunctional peripheral 1c includes a color image processing apparatus 10c instead of the color image processing apparatus 10 included in the digital color multifunctional peripheral 1 of First Embodiment. In the color image processing apparatus 10c, the segmentation class signal correction section 14b included in the color image processing apparatus 10 is omitted, and a rotation process section 21 is provided between a segmentation process section 14 and a color correction section 15.

Figure 14:
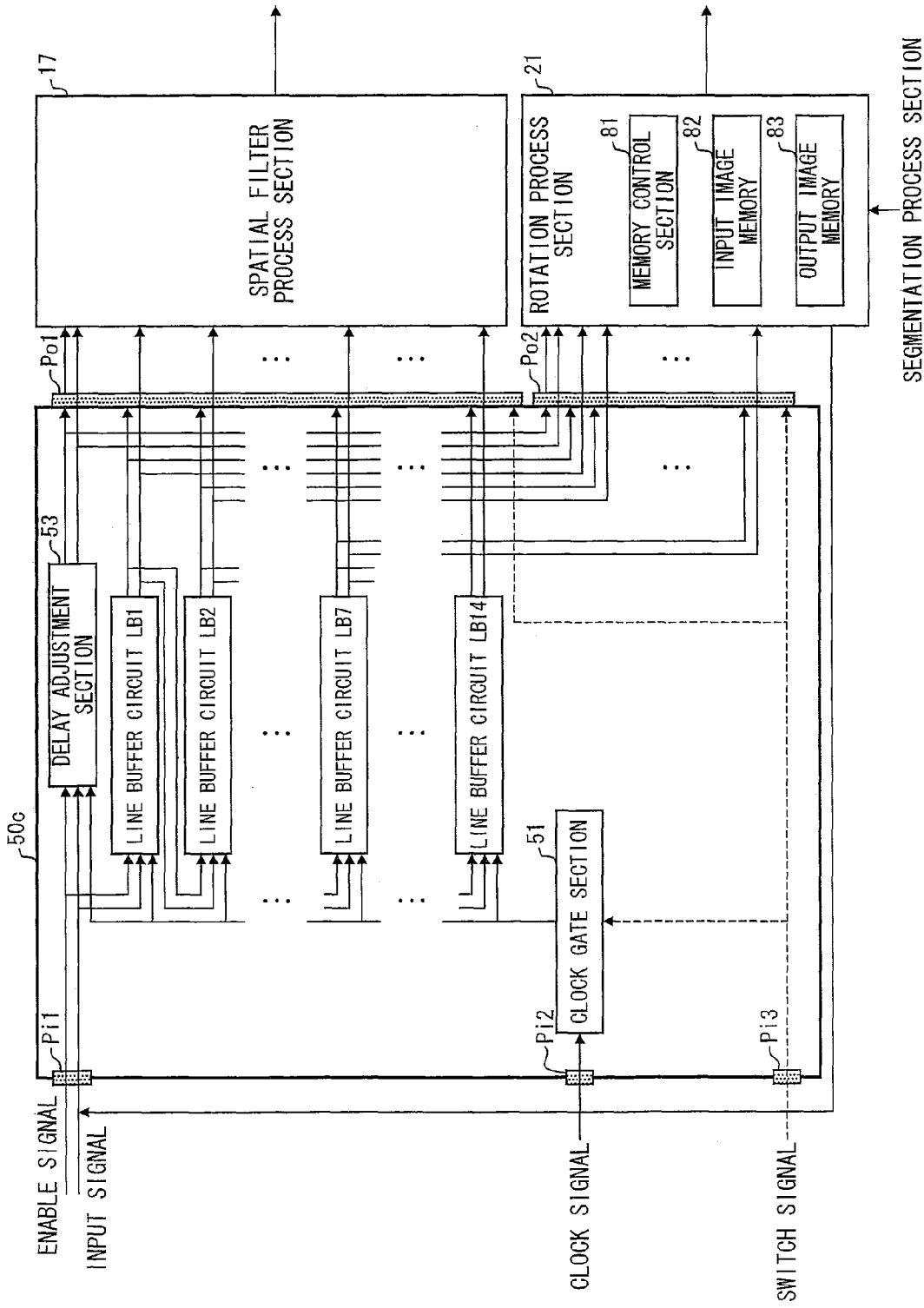
FIG. 14 is a block diagram illustrating an arrangement of a signal processing circuit, a spatial filter process section, and a rotation process section each of which is included in the image processing apparatus illustrated in FIG. 13.

In the present embodiment, the rotation process section (second process section) 21 and a spatial filter process section (first process section) 17 carry out processes, respectively, by sharing a signal process circuit (i.e., a signal process circuit 50c illustrated in FIG. 14). Note that, while a rotation process is carried out, the signal process circuit 50c functions as a part of the rotation process section 21.

FIG. 14 is a block diagram schematically illustrating an arrangement of the signal process circuit 50c, the spatial filter process section 17, and the rotation process section 21.

The signal process circuit 50c selectively (alternately) carries out (1) a process for outputting, to the spatial filter process section 17, each predetermined amount of image data (in the present embodiment, 15 pixels in main scanning direction×15 lines in sub scanning direction) from the black generation and under color removal section 16 (filter process mode) and (2) a process for outputting, to the rotation process section 21, each predetermined amount of image data or a segmentation signal (in the present embodiment, 8 pixels in main scanning direction×8 lines in sub scanning direction) read from an input image memory 82 (rotation process mode) (described later). In other words, in the filter process mode, the signal process circuit 50c outputs, to the spatial filter process section 17, image data corresponding to a total of 15 lines (i.e., image data corresponding to 1 line outputted from a delay adjustment section 53 and image data corresponding to 14 lines outputted from line buffer circuits LB1 to LB14). In the rotation process mode, the signal process circuit 50c outputs, to the rotation process section 21, image data corresponding to a total of 8 lines or segmentation class signals corresponding to a total of 8 lines (i.e., (i) image data corresponding to 1 line outputted from the delay adjustment section 53 or a segmentation class signal corresponding to 1 line outputted from the delay adjustment section 53 and (ii) image data corresponding to 7 lines outputted from the delay adjustment section 53 or segmentation class signals corresponding to 7 lines respectively outputted from the line buffer circuits LB1 to LB7).

More specifically, as illustrated in FIG. 14, the signal process circuit 50c includes input ports Pi1 to Pi3, a clock gate section 51, a delay adjustment section 53, the line buffer circuits LB1 to LB14, and output ports Po1 and Po2.

The delay adjustment section 53 delays (i) an input signal (in the filter process mode, image data from the black generation and under color removal section 16; in the rotation process mode, image data or a segmentation signal read from the input image memory 82 (described later)) corresponding to 1 line that is inputted from the input port Pi1 and (ii) an enable signal inputted from a main control section so that the input signal and the enable signal are synchronized with signals outputted from the below-described line buffer circuits (in the filter process mode, the line buffer circuits LB1 to LB14; in the rotation process mode, the line buffer circuits LB1 to LB7), and outputs the input signal 1 and the enable signal 1 that are thus delayed to the output ports Po1 and Po2. The output port Po1 is connected with the spatial filter process section 17, and the output port Po2 is connected with the rotation process section 21. The enable signal includes three control signals: a page enable signal indicative of an effective period for one page; a line enable signal indicative of an effective period for one line; and a data enable signal indicative of effectiveness/ineffectiveness of data. The signal process circuit 50c, the spatial filter process section 17, and the rotation process section 21 carry out controls, according to the enable signal.

In a case where a switch signal is indicative of the filter process mode, the output port Po1 outputs, to the spatial filter process section 17, image data respectively outputted from the delay adjustment section 53 and the line buffer circuits LB1 to LB14. On the other hand, in a case where a switch signal is indicative of the rotation process mode, the output port Po1 blocks output of the image data to the spatial filter process section 17. Further, in a case where a switch signal is indicative of the rotation process mode, the output port Po2 outputs, to the rotation process circuit 21, image data or segmentation class signals respectively outputted from the delay adjustment section 53 and the line buffer circuits LB1 to LB7. On the other hand, in a case where a switch signal is indicative of the filter process mode, the output port Po2 blocks output of the image data or the segmentation class signals to the rotation process section 21.

In response to a switch signal (a register signal) inputted from the input port Pi3 from the main control section, the clock gate section 51 blocks inputs of clock signals into the line buffer circuits LB8 to LB14 during a period when the rotation process mode is selected, and stops operations of the line buffer circuits LB8 to LB14. This reduces power consumption.

Each of the line buffer circuits LB1 to LB14 temporarily stores an input signal corresponding to 1 line, and outputs the signal with predetermined timing. An arrangement of each of the line buffer circuits is the same as that of the line buffer circuit of First Embodiment. Output terminals of the line buffer circuits LB1 to LB7 are connected with the output ports Po1 and Po2, and output terminals of the line buffer circuits LB8 to LB14 are connected with the output port Po1.

The spatial filter process section 17 carries out convolution of (i) a block (in the present embodiment, a block of 15 pixels in main scanning direction×15 pixels (15 lines) in sub scanning direction) made of pixels including a target pixel in image data to be processed with (ii) pixel values that are filter coefficients assigned to pixels of a matrix of the same size as that of the block. Thus, the spatial filter process section 17 obtains the results of filter processes (enhancement process, smoothing process, or process including characteristics of both of the enhancement process and the smoothing process) on the pixels in the block with respect to the target pixel. An arrangement of the spatial filter process section 17 and a process carried out by the spatial filter process section 17 are substantially the same as those of First Embodiment. Therefore, the descriptions thereof are omitted here.

The spatial filter process section 17 carries out the filter process with respect to each of CMYK color components. For this purpose, the spatial filter process section 17 includes four signal processing circuits 50c corresponding to C, M, Y, and K, respectively. However, the present invention is not limited to this and may be arranged such that the spatial filter process section 17 includes only one signal processing circuit 50c which sequentially carries out the filter process with respect to C, M, Y, and K one by one.

The number of pixels in the main scanning direction and the number of lines in sub scanning direction to be outputted from the signal process circuit 50c to the spatial filter process section 17 and the rotation process section 21 in the foregoing modes are not limited to the above-mentioned example, but may be changed as needed. Further, the number of line buffer circuits to be included in the signal process circuit 50c may be changed as needed in accordance with the number of lines for image data to be outputted to the spatial filter process section 17. For example, the spatial filter process section 17 may carry out the filter process in accordance with image data corresponding to 8 lines. Further, the rotation process section 21 may carry out the rotation process in accordance with image data corresponding to 4 lines or image data corresponding to 16 lines.

The rotation process section 21 carries out the rotation process with respect to image data and a segmentation class signal each of which is inputted from the segmentation process section 14 via the signal process circuit 50c. Then, the image data having been subjected to the rotation process is outputted to the color correction section 15 by the rotation process section 21. Further, the segmentation class signal having been subjected to the rotation process is outputted, by the rotation process section 21, to the black generation and under color removal section 16, the spatial filter process section 17, and the tone reproduction process section 19. An angle by which image data and a segmentation class signal are rotated may be set to, for example, (i) an angle set by a user through an operation panel 40 or (ii) an angle in accordance with a mode selected by a user. In the present embodiment, the rotation process is carried out at a rotation angle of any of 0 degree, 90 degrees, 180 degrees, or 270 degrees.

Note that the rotation process for image data is carried out with respect to each of RGB color components. As described above, the present embodiment is provided with the four signal process circuits 50c because the spatial filter process section 17 carries out the filter process with respect to CMYK image data. Therefore, the rotation process may be carried out with respect to each of the RGB color components by using three of the four signal process circuits 50c. However, the present invention is not limited to this, but may be arranged so as to carry out the rotation process with respect to each of the RGB color components one by one, in order.

Further, the rotation process with respect to image data and the rotation process with respect to a segmentation class signal may be carried out simultaneously. Furthermore, the rotation process with respect to a segmentation class signal may be carried out after the rotation process with respect to image data is carried out. In the case where the rotation process with respect to a segmentation signal is carried out after the rotation process with respect to image data is carried out, the segmentation signal may be temporarily stored in a temporary storage region (e.g., a memory) provided between the segmentation process section 14 and the signal process circuit 50c, and then the segmentation signal may be outputted to the signal process circuit 50c in accordance with a timing at which the rotation process with respect to the segmentation signal is started. Further, among the four signal process circuits 50c, the one(s) which is/are not used in the rotation process may be caused to stop operating. This reduces power consumption.

As illustrated in FIG. 14, the rotation process section 21 includes a memory control section 81, the input image memory 82, and an output image memory 83.

The input image memory 82 is a memory for temporarily storing image data and a segmentation signal each of which is inputted from the segmentation process section 14. The output image memory 83 is a memory for storing image data on which the rotation process has been carried out. The memory control section 81 controls (i) writing of data into the input image memory 82 and the output image memory 83 and (ii) reading of data from the input image memory 82 and the output image memory 83.

Figure 15:
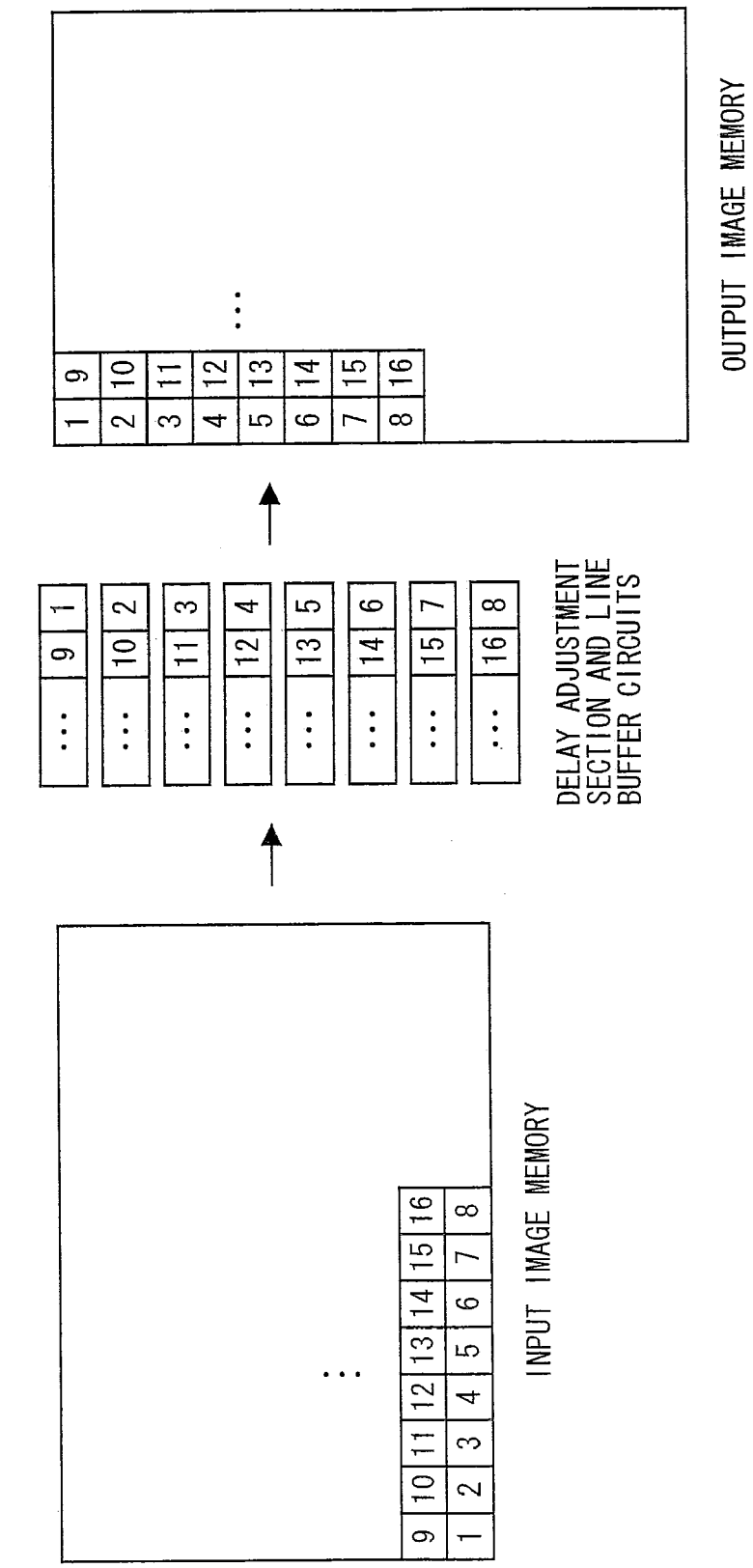
FIG. 15 is an explanatory view illustrating one example of a method of a rotation process carried out by the rotation process section illustrated in FIG. 14.

FIG. 15 is an explanatory view of the rotation process carried out by the rotation process section 21, and illustrates an example of a case where image data is rotated by 90 degrees.

Firstly, as illustrated in FIG. 15, the memory control section 81 reads image data corresponding to eight pixels among image data stored in the input image memory 82, from the left side toward the right side. Then, the memory control section 81 writes the image data corresponding to the eight pixels into the delay adjustment section 53 and the line buffer circuits LB1 to LB7, respectively. This process is carried out from the bottom line toward the top line of the image data which is stored in the input image memory 82, line by line, in order. Further, when the top line of the image data has been processed, the same process is carried out with respect to image data which is not processed yet, from the bottom line toward the top line, in order. This process is repeatedly carried out.

After that, the memory control section 81 causes the image data corresponding to the pixels outputted from the delay adjustment section 53 and the line buffer circuits LB1 to LB7 to be transferred to the output image memory 83. The data transfer rearranges the image data corresponding to the pixels in such a manner that the image data corresponding to the pixels aligned in rows in the input image memory 82 is rearranged so as to be aligned in columns in the output image memory 83. This rearrangement is carried out (i) by sequentially supplying the image data corresponding to the pixels from the delay adjustment section 53 and the line buffer circuits LB1 to LB7 to the output image memory 83 in the order that the image data corresponding to the pixels were inputted into the delay adjustment section 53 and the line buffer circuits LB1 to LB7, and (ii) by sequentially arranging the image data corresponding to the pixels into the columns from the top, from a left column to a right column, one by one. Thus, in the end, the input image data is rotated by 90 degrees, and is stored in the output image memory 83.

Figures 16A, 16B:
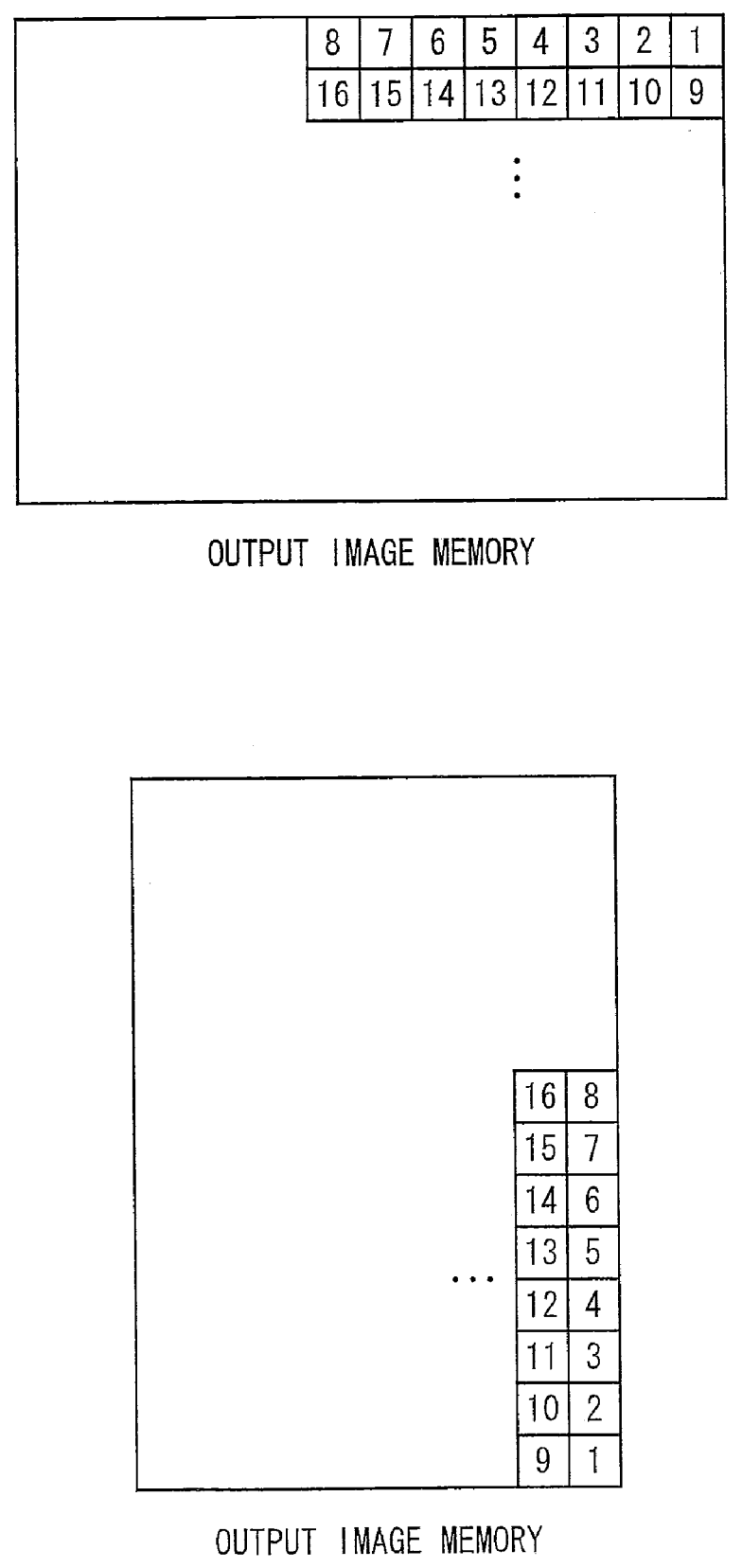

In a case where an image is rotated by 180 degrees, the data transfer may rearrange the image data corresponding to the pixels outputted from the delay adjustment section 53 and the line buffer circuits LB1 to LB7 in such a manner that the image data corresponding to the pixels aligned in rows in the input image memory 82 is rearranged so as to be aligned in rows in the output image memory 83. This rearrangement may be carried out, as illustrated in FIG. 16 (a), (i) by sequentially supplying the image data corresponding to the pixels from the delay adjustment section 53 and the line buffer circuits LB1 to LB7 to the output image memory 83 in the order that the image data corresponding to the pixels were inputted into the delay adjustment section 53 and the line buffer circuits LB1 to LB7, and (ii) by sequentially arranging the image data of the pixels into the rows from the top, from the right side toward the left side. Further, in this rearrangement, image data corresponding to eight pixels may be written into one row, and then image data corresponding to another eight pixels may be written into a next row.

In a case where an image is rotated by 270 degrees, the data transfer may rearrange the image data corresponding to the pixels outputted from the delay adjustment section 53 and the line buffer circuits LB1 to LB7 in such a manner that the image data of the pixels aligned in rows in the input image memory 82 is rearranged so as to be aligned in columns in the output image memory 83. This rearrangement may be carried out, as illustrated in FIG. 16 (b), (i) by sequentially supplying the image data corresponding to the pixels from the delay adjustment section 53 and the line buffer circuits LB1 to LB7 to the output image memory 83 in the order that the image data corresponding to the pixels were inputted into the delay adjustment section 53 and the line buffer circuits LB1 to LB7, and (ii) by sequentially arranging the image data corresponding to the pixels into the columns from the bottom, from a right column to a left column, one by one.

Further, the delay adjustment section 53 and the line buffer circuits LB1 to LB7 may transmit data to the output image memory 83 in any of the following manners: (i) When the delay adjustment section 53 and the line buffer circuits LB1 to LB7 store a predetermined transmittable unit of image data, the delay adjustment section 53 and the line buffer circuits LB1 to LB7 transmit the image data to the output image memory 83 as needed. (ii) The delay adjustment section 53 and the line buffer circuits LB1 to LB7 individually transmit data to the output image memory 83. (iii) The delay adjustment section 53 and the line buffer circuits LB1 to LB7 are divided into a plurality of groups, and each of the groups individually transmit data to the output image memory 83.

As described above, the digital color multifunctional peripheral 1c according to the present embodiment includes the line buffer circuits LB1 to LB14 and the delay adjustment section 53. When carrying out the spatial filter process, (i) image data corresponding to 14 lines respectively stored in the line buffer circuits LB1 to LB14 and (ii) image data corresponding to 1 line supplied to the delay adjustment section 53 are caused to be outputted to the spatial filter process section 17 in synchronization with each other. When carrying out the rotation process, (i) image data corresponding to 7 lines respectively stored in the line buffer circuits LB1 to LB7 and (ii) image data corresponding to 1 line supplied to the delay adjustment section 53 are caused to be outputted to the rotation process section 21 in synchronization with each other.

This allows reducing the size of a circuit, compared with a case where a line buffer circuit (signal process circuit) for the spatial filter process section 17 and a line buffer circuit (signal process circuit) for the rotation process section 21 are separately provided.

Fourth Embodiment

The following describes still further another embodiment of the present invention. Note that members having the same functions as those explained in the foregoing embodiments are given the same signs as the foregoing embodiments, and explanations thereof are omitted here.

Figure 17:
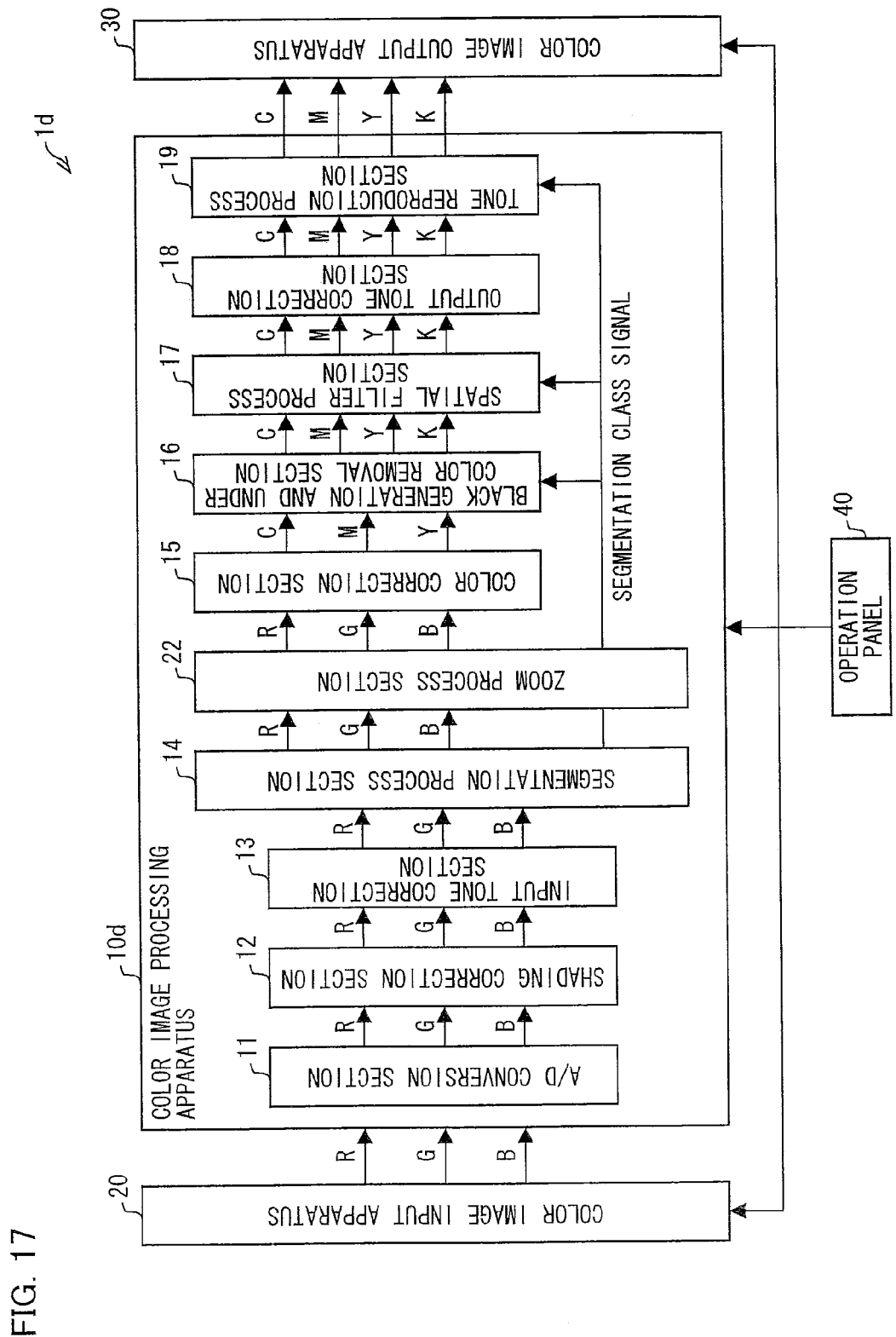
FIG. 17 is a block diagram schematically illustrating an arrangement of an image processing apparatus according to still further another embodiment of the present invention.

FIG. 17 is a block diagram schematically illustrating an arrangement of a digital color multifunctional peripheral 1d according to the present embodiment. As illustrated in FIG. 17, the digital color multifunctional peripheral 1d includes a color image processing apparatus 10d instead of the color image processing apparatus 10c included in the digital color multifunctional peripheral 1c of Third Embodiment. The color image processing apparatus 10d is arranged so as to include a zoom process section 22 instead of the rotation process section 21 included in the color image processing apparatus 10c.

In the present embodiment, the zoom process section (second process section) 22 and a spatial filter process section (first process section) 17 carry out the processes, respectively, by sharing a signal process circuit (i.e., a signal process circuit 50d illustrated in FIG. 17).

Figure 18:
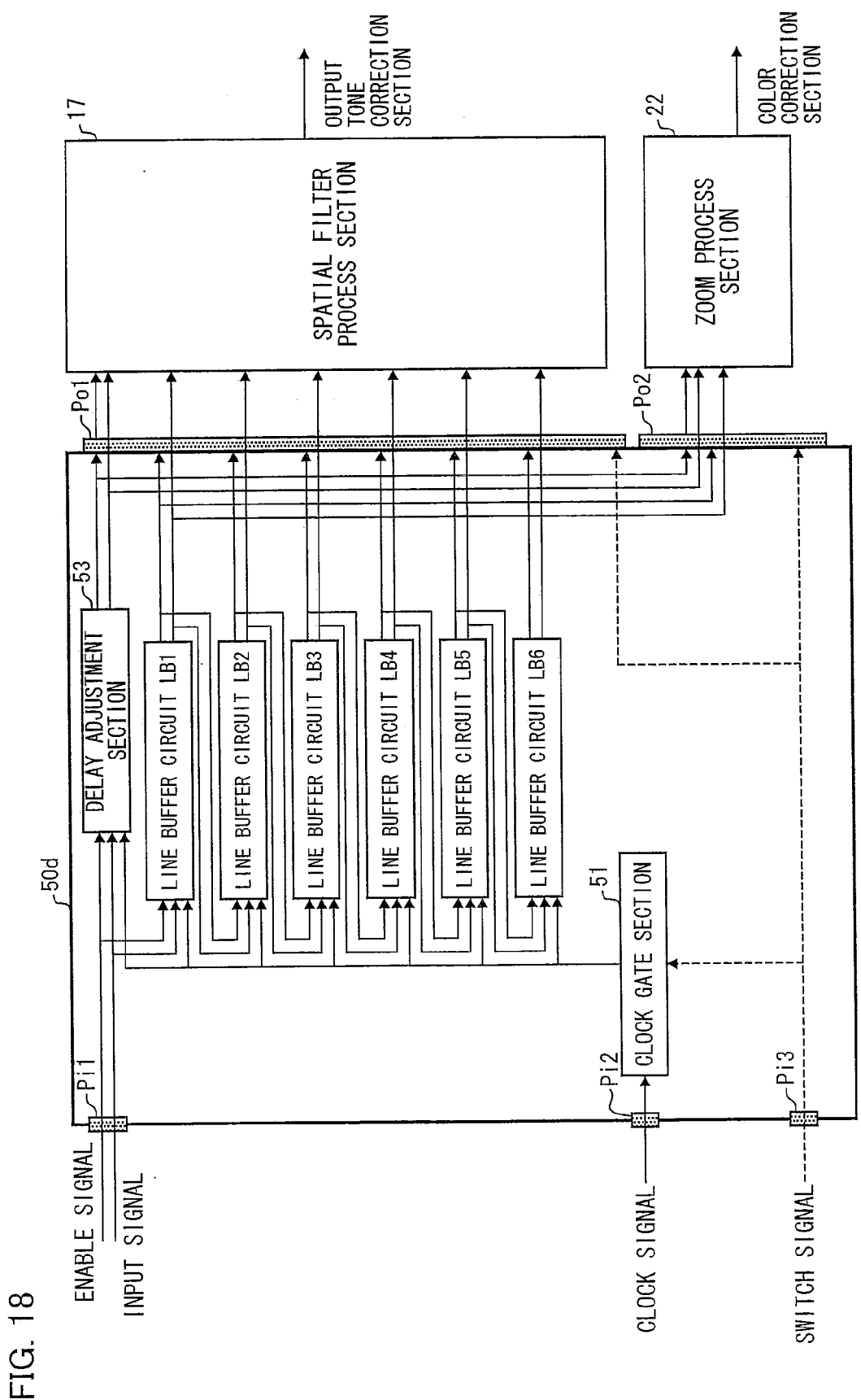
FIG. 18 is a block diagram illustrating an arrangement of a signal process circuit, a spatial filter process circuit, and a zoom process section each of which is included in the image processing apparatus illustrated in FIG. 17.

FIG. 18 is a block diagram schematically illustrating an arrangement of the signal process circuit 50d, the spatial filter process section 17, and the zoom process section 22.

The signal process circuit 50d selectively (alternately) carries out: (1) a process for outputting, to the spatial filter process section 17, each predetermined amount of image data (e.g., in the present embodiment, 7 pixels in main scanning direction×7 lines in sub scanning direction) from a black generation and under color removal section 16 (filter process mode) and (2) a process for outputting, to the zoom process section 22, each predetermined amount of image data or a segmentation signal (e.g., in the present embodiment, 2 pixels in main scanning direction×2 lines in sub scanning direction) from a segmentation process section 14 (zoom process mode). In other words, in the filter process mode, the signal process circuit 50d outputs, to the spatial filter process section 17, image data corresponding to a total of 7 lines (i.e., image data corresponding to 1 line supplied outputted from a delay adjustment section 53 and image data corresponding to 6 lines respectively outputted from line buffer circuits LB1 to LB6). In the zoom process mode, the signal process circuit 50d outputs, to the zoom process section 22, image data corresponding to a total of 2 lines or segmentation class signals corresponding to a total of 2 lines (i.e., (i) image data corresponding to 1 line outputted from the delay adjustment section 53 or a segmentation class signal corresponding to 1 line outputted from the delay adjustment section 53 and (ii) image data corresponding to 1 line outputted from the line buffer circuit LB1 or a segmentation class signal corresponding to 1 line outputted from the line buffer circuit LB1).

More specifically, as illustrated in FIG. 18, the signal process circuit 50d includes input ports Pi1 to Pi3, a clock gate section 51, the delay adjustment section 53, line buffer circuits LB1 to LB6, and output ports Po1 and Po2.

The delay adjustment section 53 delays (i) an input signal (in the filter process mode, image data from the black generation and under color removal section 16; in the zoom process mode, image data or a segmentation signal from the segmentation process section 14) corresponding to 1 line inputted from the input port Pi1 and (ii) an enable signal inputted from a main control section so that the input signal and the enable signal are synchronized with signal(s) outputted from the below-described line buffer circuit(s) (in the filter process mode, the line buffer circuits LB1 to LB6; in the zoom process mode, the line buffer circuit LB1), and outputs the input signal and the enable signal that are thus delayed to the output ports Po1 and Po2. The output port Po1 is connected with the spatial filter process section 17, and the output port Po2 is connected with the zoom process section 22. The enable signal includes three control signals: a page enable signal indicative of an effective period for one page; a line enable signal indicative of an effective period for one line; and a data enable signal indicative of effectiveness/ineffectiveness of data. The signal process circuit 50d, the spatial filter process section 17, and the zoom process section 22 carry out various kinds of control, respectively, in accordance with the enable signals.

In a case where a switch signal is indicative of the filter process mode, the output port Po1 outputs, to the spatial filter process section 17, image data outputted from the delay adjustment section 53 and the line buffer circuits LB1 to LB6. On the other hand, in a case where a switch signal is indicative of the zoom process mode, the output port Po1 blocks output of the image data to the spatial filter process section 17. Further, in a case where a switch signal is indicative of the zoom process mode, the output port Po2 outputs, to the zoom process circuit 22, image data or segmentation class signals outputted from the delay adjustment section 53 and the line buffer circuit LB1. On the other hand, in a case where a switch signal is indicative of the filter process mode, the output port Po2 blocks output of the image data or the segmentation class signals to the zoom process section 22.

In response to a switch signal (register signal) inputted from the input port Pi3 from the main control section, the clock gate section 51 blocks inputs of clock signals into the line buffer circuits LB2 to LB6 during a period when the zoom process mode is selected, and stops operations of the line buffer circuits LB2 to LB6. This reduces power consumption.

Each of the line buffer circuits LB1 to LB6 temporarily stores an input signal corresponding to 1 line, and outputs the input signal with predetermined timing. An arrangement of each of the line buffer circuits is the same as that of the line buffer circuit of First Embodiment. An output terminal of the line buffer circuit LB1 is connected with the output ports Po1 and Po2, and output terminals of the line buffer circuits LB2 to LB6 are connected with the output port Po1.

An arrangement of the spatial filter process section 17 and operation of the spatial filter process section 17 while the filter process is carried out are substantially the same as those of the foregoing embodiments. Therefore, the descriptions thereof are omitted here.

The spatial filter process section 17 carries out the filter process with respect to each of CMYK color component. For this purpose, the spatial filter process section 17 includes four signal process circuits 50d corresponding to C, M, Y, and K, respectively. However, the present invention is not limited to this, and may be arranged such that the spatial filter process section 17 includes only one signal process circuit 50d which sequentially carries out the filter process with respect to C, M, Y, and K one by one.

The number of pixels in the main scanning direction and the number of lines in the sub scanning direction to be outputted from the signal process circuit 50d to the spatial filter process section 17 and to the zoom process section 22 in the foregoing modes are not limited to the above-mentioned example, but may be changed as needed. Further, the number of line buffer circuits to be included in the signal process circuit 50d may be changed as needed in accordance with the number of lines for image data to be outputted to the spatial filter process section 17. For example, the spatial filter process section 17 may carry out the filter process in accordance with image data corresponding to 15 lines.

The zoom process section 22 carries out the zoom process (an enlarging process or a reducing process) with respect to image data and a segmentation class signal each of which is inputted from the segmentation process section 14. Then, the image data on which the zoom process has been carried out is outputted to a color correction section 15 from the zoom process section 22, and the segmentation class signal on which the zoom process has been carried out is outputted, from the zoom process section 22, to the black generation and under color removal section 16, the spatial filter process section 17, and a tone reproduction process section 19. A zoom ratio of the zoom process is set, for example, by a user through an operation panel 40. The present embodiment is arranged so as to be capable of separately carrying out (i) the zoom process in the main scanning direction and (ii) the zoom process in the sub scanning direction.

Note that the zoom process for image data is carried out with respect to each of RGB color components. As described above, the present embodiment is provided with the four signal process circuits 50d, because the spatial filter process section 17 carries out the filter process with respect to CMYK image data. Therefore, the zoom process with respect to each of the RGB color components may be carried out by using three of the four signal process circuits 50d. However, the present invention is not limited to this, but may be arranged so as to carry out the zoom process with respect to each of the RGB color components one by one, in order.

Further, the zoom process with respect to image data and the zoom process with respect to a segmentation class signal may be carried out simultaneously. Furthermore, the zoom process with respect to a segmentation class signal may be carried out after the zoom process with respect to image data is carried out. In the case where the zoom process with respect to a segmentation signal is carried out after the zoom process with respect to image data is carried out, the segmentation signal may be temporarily stored in a temporary storage region (e.g., a memory) provided between the segmentation process section 14 and the signal process circuit 50d, and then the segmentation signal may be outputted to the signal process circuit 50d in accordance with a timing at which the zoom process with respect to the segmentation signal is started. Further, among the four signal process circuits 50d, the one(s) which is/are not used in the zoom process may be caused to stop operating. This reduces power consumption.

Figure 19:
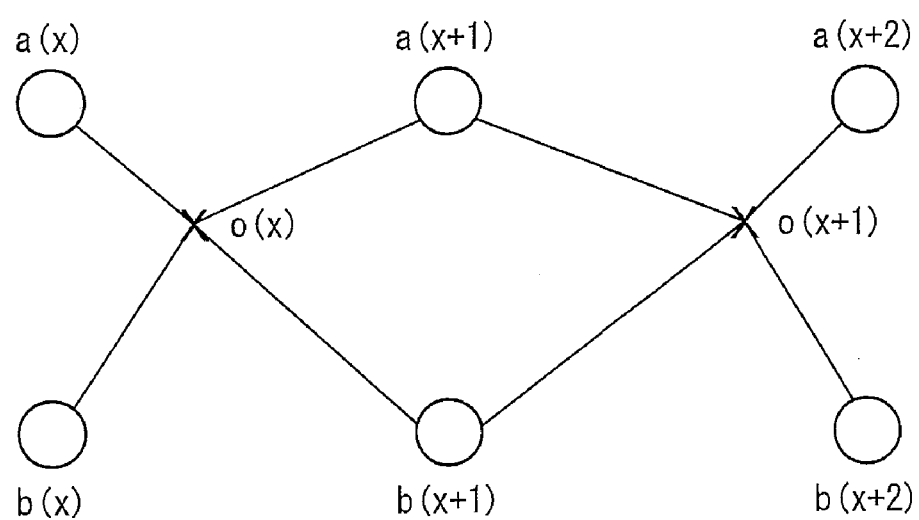
FIG. 19 is an explanatory view illustrating one example of a method of a zoom process carried out by the zoom process section illustrated in FIG. 18.

FIG. 19 is an explanatory view illustrating a method of the zoom process carried out by the zoom process section 22. The zoom process section 22 determines a zoom ratio in accordance with an instruction inputted by a user through the operation panel 40. Then, the zoom process section 22 works out coordinates o(x) of pixels in image data to be obtained when the zoom process is carried out in accordance with the zoom ratio thus determined. After that, the zoom process section 22 extracts, from image data on which the zoom process is not carried out yet, coordinates a(x), a(x+1), b(x), and b(x+1), which are four points (four pixels) in the vicinity of the coordinate o(x) worked out in the image data to be obtained when the zoom process is carried out. Then, the zoom process section 22 respectively works out distances between (i) the coordinate o(x) worked out in the image data to be obtained when the zoom process is carried out and (ii) the four points thus extracted. Subsequently, the zoom process section 22 determines, among the four points, a point which has the shortest distance to the coordinate o(x), and sets a value of the selected point as a value of a pixel corresponding to the coordinate o(x) worked out in the image data to be obtained when the zoom process is carried out (a nearest neighbor process). Note that the method of the zoom process is not limited to this, but use various methods conventionally known to public.

As described above, the digital color multifunctional peripheral 1d according to the present embodiment includes the line buffer circuits LB1 to LB6 and the delay adjustment section 53. When carrying out the spatial filter process, (i) image data corresponding to 6 lines respectively stored in the line buffer circuits LB1 to LB6 and (ii) image data corresponding to 1 line supplied to the delay adjustment section 53 are caused to be outputted to the spatial filter process section 17 in synchronization with each other. When carrying out the zoom process, (i) image data corresponding to 1 line stored in the line buffer circuit LB1 and (ii) image data corresponding to 1 line supplied to the delay adjustment section 53 are caused to be outputted to the zoom process section 22 in synchronization with each other.

This allows reducing the size of a circuit, compared with a case where a line buffer circuit (signal process circuit) for the spatial filter process section 17 and a line buffer circuit (signal process circuit) for the zoom process section 22 are separately provided.

Fifth Embodiment

The following describes yet another embodiment of the present invention. Note that members having the same functions as those explained in the foregoing embodiments are given the same signs as the foregoing embodiments, and explanations thereof are omitted here.

Figure 20:
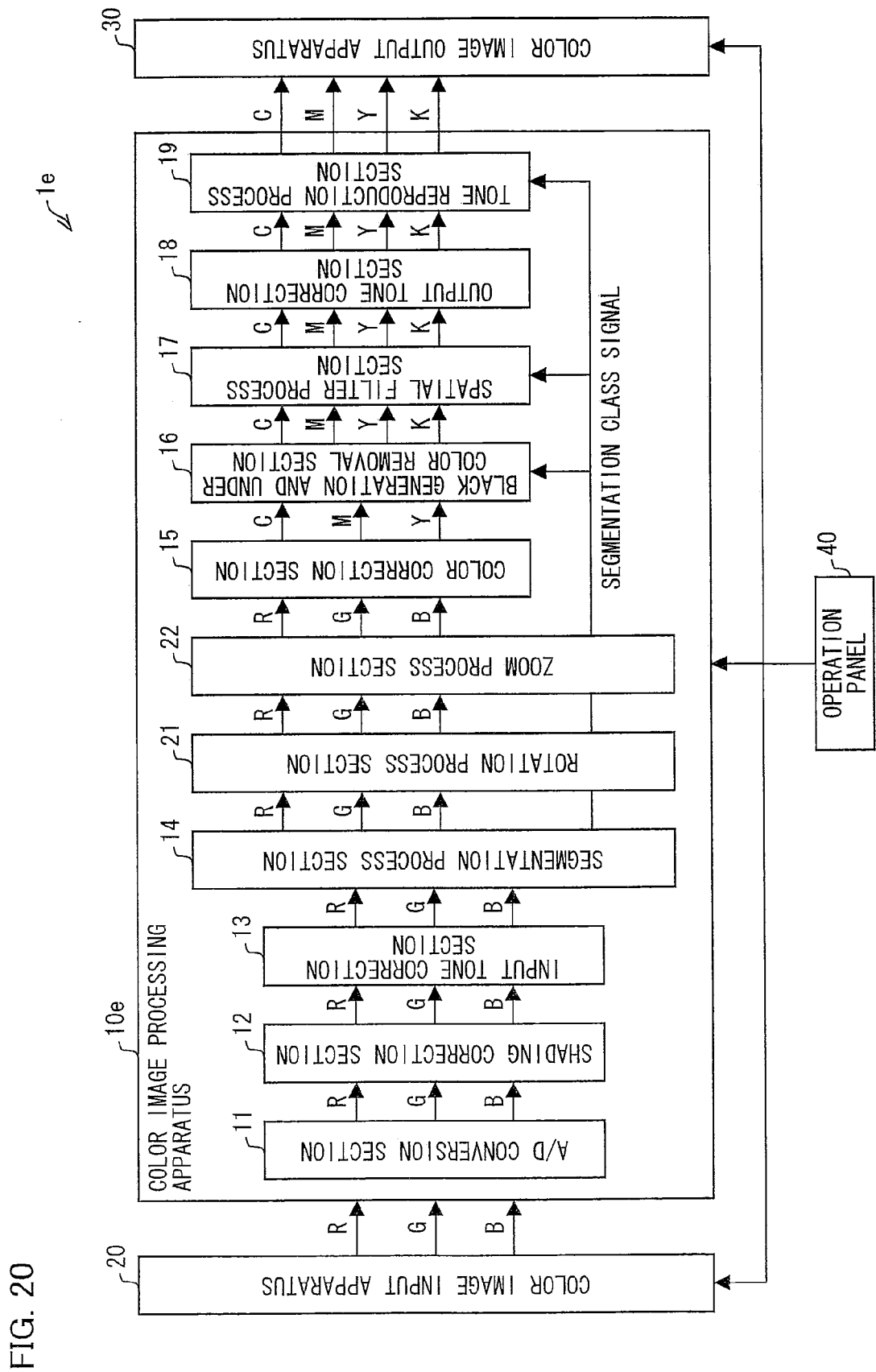
FIG. 20 is a block diagram schematically illustrating an arrangement of an image processing apparatus according to yet another embodiment of the present invention.

FIG. 20 is a block diagram schematically illustrating an arrangement of a digital color multifunctional peripheral 1e according to the present embodiment. As illustrated in FIG. 20, the digital color multifunctional peripheral 1e includes a color image processing apparatus 10e instead of the color image processing apparatus 10c included in the digital color multifunctional peripheral 1c of Third Embodiment. The color image processing apparatus 10e includes, in addition to the arrangement of the color image processing apparatus 10c, a zoom process section 22 provided between a rotation process section 21 and a color correction section 15.

Figure 21:
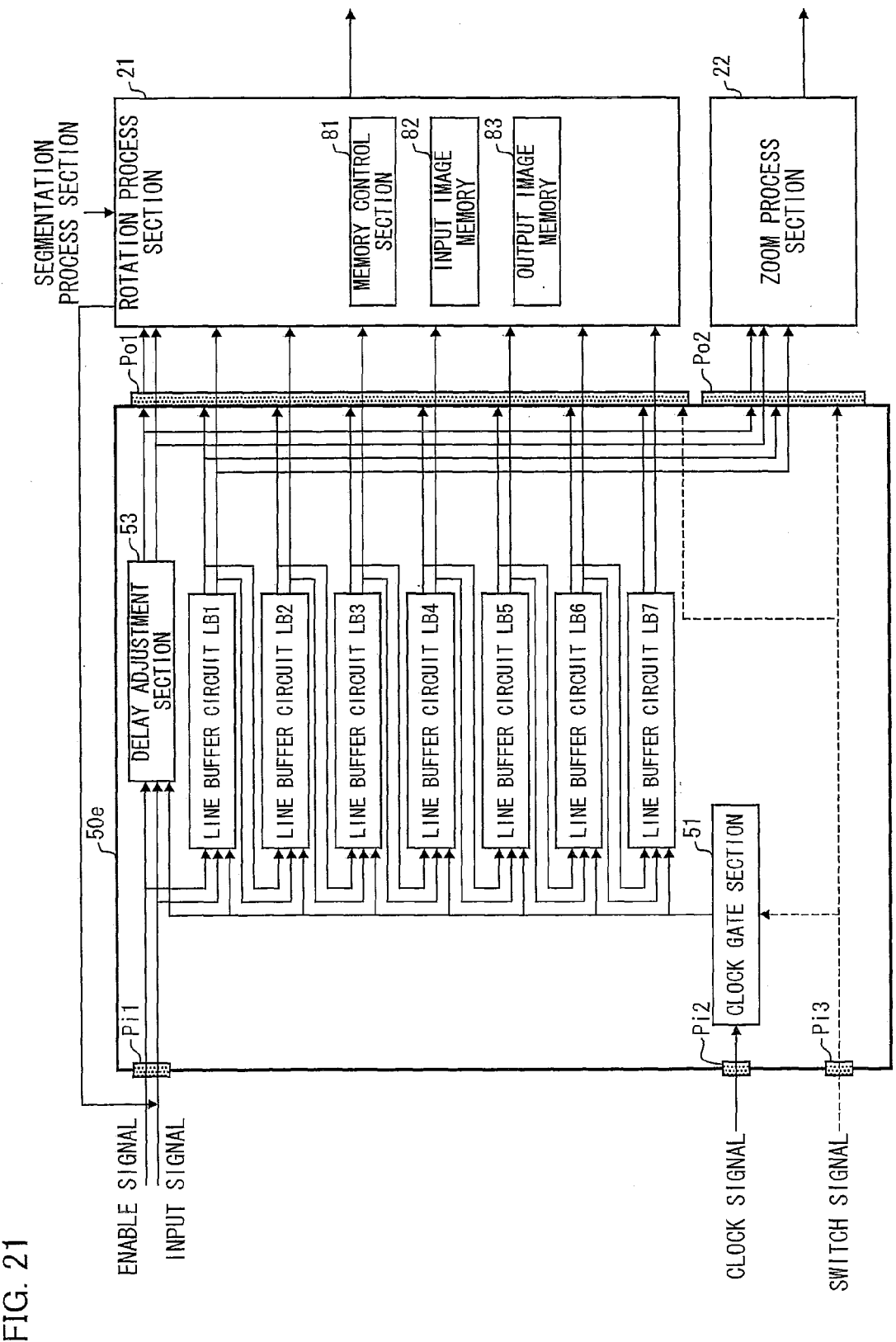
FIG. 21 is a block diagram illustrating an arrangement of a signal processing circuit, a rotation process section, and a zoom process section each of which is included in the image processing apparatus illustrated in FIG. 20.

In the present embodiment, the rotation process section (first process section) 21 and the zoom process section (second process section) 22 carry out processes, respectively, by sharing a signal process circuit (a signal process circuit 50e illustrated in FIG. 21).

FIG. 21 is a block diagram schematically illustrating an arrangement of the signal process circuit 50e, the rotation process section 21, and the zoom process section 22.

The signal process circuit 50e selectively (alternately) carries out: (1) a process for outputting, to the rotation process section 21, each predetermined amount of image data or a segmentation signal (in the present embodiment, 8 pixels in main scanning direction×8 lines in sub scanning direction) from a segmentation process section 14 (rotation process mode) and (2) a process for outputting, to the zoom process section 22, each predetermined amount of image data or a segmentation signal (in the present embodiment, 2 pixels in main scanning direction×2 lines in sub scanning direction) from the segmentation process section 14 (zoom process mode). In other words, in the rotation process mode, the signal process circuit 50e outputs, to the rotation process section 21, image data corresponding to a total of 8 lines (i.e., (i) image data corresponding to 1 line outputted from the delay adjustment section 53 and (ii) image data corresponding to 7 lines respectively outputted from the line buffer circuits LB1 to LB7). In the zoom process mode, the signal process circuit 50e outputs, to the zoom process section 22, image data corresponding to a total of 2 lines or segmentation class signals corresponding to a total of 2 lines (i.e., (i) image data corresponding to 1 line outputted from the delay adjustment section 53 or a segmentation class signal corresponding to 1 line outputted from the delay adjustment section 53 and (ii) image data corresponding to 1 line outputted from the line buffer circuit LB1 or a segmentation class signal corresponding to 1 line outputted from the line buffer circuit LB1).

More specifically, as illustrated in FIG. 21, the signal process circuit 50e includes input ports Pi1 to Pi3, a clock gate section 51, a delay adjustment section 53, line buffer circuits LB1 to LB7, and output ports Po1 and Po2.

The delay adjustment section 53 delays an input signal corresponding to 1 line that is inputted from the input port Pi1 and an enable signal that is inputted from a main control section so that the input signal and the enable signal are synchronized with signal(s) outputted from the below-described line buffer circuit(s) (in the rotation process mode, the line buffer circuits LB1 to LB7; in the zoom process mode, the line buffer circuit LB1), and outputs the input signal and the enable signal that are thus delayed to the output ports Po1 and Po2. The output port Po1 is connected with the rotation process section 21, and the output port Po2 is connected with the zoom process section 22. The enable signal includes three control signals: a page enable signal indicative of an effective period for one page; a line enable signal indicative of an effective period for one line; and a data enable signal indicative of effectiveness/ineffectiveness of data. The signal process circuit 50e, the rotation process section 21, and the zoom process section 22 carry out controls according to with the enable signal.

In a case where a switch signal is indicative of the rotation process mode, the output port Po1 outputs, to the rotation process section 21, image data or segmentation class signals respectively outputted from the delay adjustment section 53 and the line buffer circuits LB1 to LB7. On the other hand, in a case where a switch signal is indicative of the zoom process mode, the output port Po1 blocks output of the image data or the segmentation class signals to the rotation process section 21. In a case where a switch signal is indicative of the zoom process mode, the output port Po2 outputs, to the zoom process section 22, image data or segmentation class signals outputted from the delay adjustment section 53 and the line buffer circuit LB1. On the other hand, in a case where a switch signal is indicative of the rotation process mode, the output port Po2 blocks output of the image data or the segmentation class signals to the zoom process section 22.

In response to a switch signal (register signal) inputted from the input port Pi3 from the main control section, the clock gate section 51 blocks inputs of clock signals into the line buffer circuits LB2 to LB7 during a period when the zoom process mode is selected, and stops operations of the line buffer circuits LB2 to LB7. This reduces power consumption.

Each of the line buffer circuits LB1 to LB7 temporarily stores an input signal corresponding to 1 line, and outputs the input signal with predetermined timing. An arrangement of each of the line buffer circuits LB1 to LB7 is the same as that of the line buffer circuit of First Embodiment. An output terminal of the line buffer circuit LB1 is connected with the output ports Po1 and Po2; and output terminals of the line buffer circuits LB2 to LB7 are connected with the output port Po1.

The number of pixels in the main scanning direction and the number of lines in the sub scanning direction to be outputted from the signal process circuit 50e to the rotation process section 21 and the zoom process section 22 in the foregoing modes are not limited to the above-mentioned example, but may be changed as needed. Further, the number of line buffer circuits to be included in the signal process circuit 50e may be changed as needed in accordance with the number of lines for image data to be outputted to the rotation process section 21.

An arrangement of the rotation process section 21 and operation of the rotation process section 21 are substantially the same as those of Third Embodiment. Further, an arrangement of the zoom process section 22 and operation of the zoom process section 22 are substantially the same as those of Fourth Embodiment. Therefore, the descriptions of the rotation process section 21 and the zoom process section 22 are omitted here.

As described above, the digital color multifunctional peripheral 1e according to the present embodiment includes the line buffer circuits LB1 to LB7 and the delay adjustment section 53. When carrying out the rotation process, (i) image data corresponding to 7 lines respectively stored in the line buffer circuits LB1 to LB7 and (ii) image data corresponding to 1 line supplied to the delay adjustment section 53 are caused to be outputted to the rotation process section 21 in synchronization with each other. When carrying out the zoom process, (i) image data corresponding to 1 line stored in the line buffer circuit LB1 and (ii) image data supplied to the delay adjustment section 53 are caused to be outputted to the zoom process section 22 in synchronization with each other.

This allows reducing the size of a circuit, compared with a case where a line buffer circuit (signal process circuit) for the rotation process section 21 and a line buffer circuit (signal process circuit) for the zoom process section 22 are separately provided.

Further, in the foregoing embodiments, the sections (the blocks) of the color image processing apparatus 10 included in the digital color multifunctional peripheral 1 may be realized by way of software with a processor such as a CPU as follows: The digital color multifunctional peripheral 1 includes a CPU (central processing unit) and memory devices (memory media). The CPU (central processing unit) executes instructions in control programs realizing the functions. The memory devices include a ROM (read only memory) which contains programs, a RAM (random access memory) to which the programs are loaded, and a memory (a storage medium) containing the programs and various data. The objective of the present invention can also be achieved by mounting to the digital color multifunctional peripheral 1 a computer-readable storage medium containing control program code (executable program, intermediate code program, or source program) for the color image processing apparatus 10, which is software realizing the aforementioned functions, in order for the computer (or CPU, MPU) to retrieve and execute the program code contained in the storage medium.

The storage medium may be, for example, a tape, such as a magnetic tape or a cassette tape; a magnetic disk, such as a Floppy (Registered Trademark) disk or a hard disk, or a disk such as an optical disk (e.g., CD-ROM/MO/MD/DVD/CD-R); a card, such as an IC card (e.g., a memory card) or an optical card; or a semiconductor memory, such as a mask ROM/EPROM/EEPROM/flash ROM.

The color image processing apparatus 10 may be arranged to be connectable to a communications network so that the program code may be delivered over the communications network. The communications network is not limited in any particular manner, and may be, for example, the Internet, an intranet, extranet, LAN, ISDN, VAN, CATV communications network, virtual dedicated network (virtual private network), telephone line network, mobile communications network, or satellite communications network. The transfer medium which makes up the communications network is not limited in any particular manner, and may be, for example, wired line, such as IEEE 1394, USB, electric power line, cable TV line, telephone line, or ADSL line; or wireless, such as infrared radiation (IrDA, remote control), Bluetooth (Registered Trademark), 802.11 wireless, HDR, mobile telephone network, satellite line, or terrestrial digital network. The present invention encompasses a carrier wave or data signal transmission in which the program code is embodied electronically.

Further, the blocks of the color image processing apparatus 10 are not limited to the ones realized by way of software, but may be realized by way of hardware. Furthermore, the blocks of the color image processing apparatus 10 may be realized by a combination of (i) hardware carrying out part of processes and (ii) operation means for executing software which controls the hardware or carries out the processes that the hardware does not carry out.

An image processing apparatus according to the present invention is an image processing apparatus for carrying out an image process with respect to image data including data corresponding to a plurality of lines, said image processing apparatus, including: a first process section for carrying out a first process in accordance with data corresponding to n lines (n: an integer equal to or more than 3); a second process section for carrying out a second process in accordance with data corresponding to m lines (m: an integer less than n); and a signal process section for causing data corresponding to a plurality of lines to be outputted in synchronization with each other, the signal process section including: (n−1) or more line buffers each of which stores data corresponding to one line; and a first delay adjustment section for delaying and outputting inputted data corresponding to one line, in a case where the first process is carried out, the signal process section causing (i) data corresponding to (n−1) lines stored in (n−1) line buffers and (ii) data corresponding to one line supplied to the first delay adjustment section to be outputted to the first process section in synchronization with each other, and in a case where the second process is carried out, the signal process section causing (i) data corresponding to (m−1) line(s) stored in (m−1) line buffer(s) among the (n−1) line buffers and (ii) data corresponding to one line supplied to the first delay adjustment section to be outputted to the second process section in synchronization with each other.

With this arrangement, the signal process section includes: (n−1) or more line buffers each of which stores data corresponding to one line; and the first delay adjustment section for delaying and outputting inputted data corresponding to one line. In a case where the first process is carried out, the signal process circuit causes (i) data corresponding to (n−1) lines stored in (n−1) line buffers and (ii) data corresponding to one line supplied to the first delay adjustment section to be outputted to the first process section in synchronization with each other. In a case where the second process is carried out, the signal process circuit causes (i) data corresponding to (m−1) line(s) stored in (m−1) line buffer(s) and (ii) data corresponding to one line supplied to the first delay adjustment section to be outputted to the second process section in synchronization with each other. Therefore, by sharing the signal process section between the first process section and the second process section, it is possible to carry out (i) the synchronization of data corresponding to n line(s) to be supplied to the first process section and (ii) the synchronization of data corresponding to m lines to be supplied to the second process section. This makes it possible to reduce the size of a circuit, compared with an arrangement where a signal process section for the first process section and a signal process section for the second process section are separately provided.

Further, the image processing apparatus according to the present invention may be arranged such that: the second process section includes: a dilation process section for (i) referring to binary data corresponding to m lines containing a target pixel and (ii) carrying out, in a case where a pixel whose binary data is "1" exists among a predetermined number of pixels around the target pixel, a dilation process in which binary data of the target pixel is set to "1"; and an erosion process section for (i) referring to binary data corresponding to m lines containing a target pixel and (ii) carrying out, in a case where a pixel whose binary data is "0" exists among a predetermined number of pixels around the target pixel, an erosion process in which the binary data of the target pixel is set to "0", and the signal process section further includes: a second delay adjustment section for delaying and outputting inputted data corresponding to one line; and a switch for changing a source from which data is supplied to at least part of the (n−1) or more line buffers, the source being changed according to whether the first process or the second process is carried out; and in a case where the second process is carried out, the signal process section causes (i) data corresponding to (m−1) line(s) stored in the (m−1) line buffer(s) and (ii) data corresponding to one line supplied to the first delay adjustment section to be outputted to one of the dilation process section and the erosion process section in synchronization with each other, the signal process section causes data corresponding to (m−1) line(s) among data corresponding to m lines outputted by the one of the dilation process section and the erosion process section to be supplied to line buffer(s) different from the (m−1) line buffer(s) from which the data is supplied to the one of the dilation process section and the erosion process section, the signal process section causes remaining data corresponding to one line among the data corresponding to the m lines data to be supplied to the second delay adjustment section, and the signal process section causes the data corresponding to the m lines to be supplied to the other one of the dilation process section and the erosion process section in synchronization with each other.

With this arrangement, it is possible to carry out the first process, the dilation process, and the erosion process by sharing the signal process section between the sections for carrying out these processes. This makes it possible to reduce the size of a circuit, compared with an arrangement where signal process sections for these processes are separately provided.

Furthermore, the image processing apparatus according to the present invention may be arranged so as to further include: a segmentation process section for (i) determining an image type of a region to which the target pixel belongs to and (ii) generating a segmentation class signal indicative of a determined result, the second process section carrying out the dilation process and the erosion process with respect to the segmentation class signal.

With this arrangement, by carrying out the dilation process and the erosion process with respect to the segmentation class signal, it is possible to remove from the segmentation class signal a noise such as an isolated point.

Moreover, the image forming apparatus according to the present invention may be arranged such that the second process section carries out the dilation process and the erosion process with respect to the image data.

With this arrangement, by carrying out the dilation process and the erosion process with respect to the image data, it is possible to remove from the image data a noise such as an isolated point.

Furthermore, the image processing apparatus according to the present invention may be arranged such that the second process section carries out a rotation process as the second process with respect to the image data. With this arrangement, it is possible to carry out the dilation process and the erosion process with respect to the image data.

Moreover, the image processing apparatus according to the present invention may be arranged such that the second process section carries out a zoom process as the second process with respect to the image data. With this arrangement, it is possible to carry out the zoom process with respect to the image data. In other words, it is possible to carry out, with respect to the image data, at least any one of an enlarging process and a reducing process.

Furthermore, the image processing apparatus according to the present invention may be arranged such that: the first process section carries out a rotation process as the first process with respect to the image data; and the second process section carries out the zoom process as the second process with respect to the image data. With this arrangement, it is possible to carry out the rotation process and the zoom process with respect to the image data.

Moreover, the image processing apparatus according to the present invention may be arranged such that the first process section carries out a spatial filter process as the first process with respect to the image data.

With this arrangement, by carrying out the spatial filter process with respect to the image data, it is possible to carry out, for example, an enhancement process and a smoothing process with respect to the image data.

Furthermore, the image processing apparatus according to the present invention may be arranged so as to include an output control section for (i) causing, regardless of whether the first process or the second process is carried out, data outputted from the (n−1) line buffers or the (m−1) line buffer(s) to be outputted to the first process section and the second process section and (ii) causing, regardless of whether the first process or the second process is carried out, an enable signal to be outputted to the first process section and the second process section, the enable signal indicating whether or not the first process and the second process are carried out by the first process section and the second process section, respectively.

With this arrangement, the data supplied from the line buffer(s) is outputted to the first process section and the second process section, regardless of whether the first process or the second process is carried out. This eliminates a need for providing a switch for changing, according to whether the first process or the second process is carried out, a destination to which the data (from the line buffer(s)) is outputted. This further reduces the size of a circuit of the signal process section. Further, it is possible for the first process section and the second process section to change, in accordance with the enable signal, their operation so that the first process or the second process is carried out. This prevents the first process section and the second process section from carrying out a wrong process.

Moreover, the image processing apparatus according to the present invention may be arranged such that, in a case where the second process is carried out, among the (n−1) or more line buffers, line buffer(s) which is(are) not used to output data to the second process section is caused to stop operating.

With this arrangement, by stopping the operation of the line buffer(s) not in use, it is possible to reduce electric power consumption.

The image forming apparatus according to the present invention includes (i) any one of the foregoing image processing apparatuses and (ii) an image forming section for forming, on a recording material, an image in accordance with the image data outputted from the image processing apparatus.

Accordingly, it is possible to reduce the size of a circuit of the image processing apparatus included in the image forming apparatus.

The embodiments and concrete examples of implementation discussed in the foregoing detailed explanation serve solely to illustrate the technical details of the present invention, which should not be narrowly interpreted within the limits of such embodiments and concrete examples, but rather may be applied in many variations within the spirit of the present invention, provided such variations do not exceed the scope of the patent claims set forth below.

The invention claimed is:

1. An image processing apparatus for carrying out an image process with respect to image data including data corresponding to a plurality of lines, said image processing apparatus, comprising:

a first process section for carrying out a first process in accordance with data corresponding to n lines (n: an integer equal to or more than 3);

a second process section for carrying out a second process in accordance with data corresponding to m lines (m: an integer less than n); and a signal process section for causing data corresponding to a plurality of lines to be outputted in synchronization with each other, the second process section includes:

a dilation process section for (i) referring to binary data corresponding to m lines containing a target pixel and (ii) carrying out, in a case where a pixel whose binary data is "1" exists among a predetermined number of pixels around the target pixel, a dilation process in which binary data of the target pixel is set to "1"; and an erosion process section for (i) referring to binary data corresponding to m lines containing a target pixel and (ii) carrying out, in a case where a pixel whose binary data is "0" exists among a predetermined number of pixels around the target pixel, an erosion process in which the binary data of the target pixel is set to "0", the signal process section including:

(n−1) or more line buffers each of which stores data corresponding to one line; and a first delay adjustment section for delaying and outputting inputted data corresponding to one line;

a second delay adjustment section for delaying and outputting inputted data corresponding to one line; and a switch for changing a source from which data is supplied to at least part of the (n−1) or more line buffers, the source being changed according to whether the first process or the second process is carried out;

in a case where the first process is carried out, the signal process section causing (i) data corresponding to (n−1) lines stored in (n−1) line buffers and (ii) data corresponding to one line supplied to the first delay adjustment section to be outputted to the first process section in synchronization with each other, and in a case where the second process is carried out, the signal process section causing (i) data corresponding to (m−1) line(s) stored in (m−1) line buffer(s) and (ii) data corresponding to one line supplied to the first delay adjustment section to be outputted to one of the dilation process section and the erosion process section in synchronization with each other, the signal process section causing data corresponding to (m−1) line(s) among data corresponding to m lines outputted by the one of the dilation process section and the erosion process section to be supplied to line buffer(s) different from the (m−1) line buffer(s) from which the data is supplied to the one of the dilation process section and the erosion process section, the signal process section causing remaining data corresponding to one line among the data corresponding to the m lines data to be supplied to the second delay adjustment section, and the signal process section causing the data corresponding to the m lines to be supplied to the other one of the dilation process section and the erosion process section in synchronization with each other.

2. The image processing apparatus as set forth in claim 1, further comprising: a segmentation process section for (i) determining an image type of a region to which the target pixel belongs to and (ii) generating a segmentation class signal indicative of a determined result, the second process section carrying out the dilation process and the erosion process with respect to the segmentation class signal.

3. The image processing apparatus as set forth in claim 1, wherein: the second process section carries out the dilation process and the erosion process with respect to the image data.

4. The image processing apparatus as set forth in claim 1, wherein: the first process section carries out a spatial filter process as the first process with respect to the image data.

5. The image processing apparatus as set forth in claim 1, wherein: the signal process section further includes: an output control section for (i) causing, regardless of whether the first process or the second process is carried out, data outputted from the (n−1) line buffers or the (m−1) line buffer(s) to be outputted to the first process section and the second process section and (ii) causing, regardless of whether the first process or the second process is carried out, an enable signal to be outputted to the first process section and the second process section, the enable signal indicating whether or not the first process and the second process are carried out by the first process section and the second process section, respectively.

6. The image processing apparatus as set forth in claim 1, wherein: in a case where the second process is carried out, among the (n−1) or more line buffers, line buffer(s) which is(are) not used to output data to the second process section is caused to stop operating.

7. An image forming apparatus, comprising:

the image processing apparatus as set forth in claim 1; and an image forming section for forming, on a recording material, an image in accordance with the image data outputted from the image processing apparatus, said image processing apparatus.

* * * * *